United States Patent [19]
Vigil et al.

[11] 3,828,324
[45] Aug. 6, 1974

[54] FAIL-SOFT INTERRUPT SYSTEM FOR A DATA PROCESSING SYSTEM

[75] Inventors: Jacob F. Vigil, Sierra Madre; Stephen L. Billard, San Gabriel; Joel T. Oropesa, Los Angeles, all of Calif.; Ralph W. Armstrong, Jr., West Chester, Pa.

[73] Assignee: Burroughs Corporation, Detroit, Mich.

[22] Filed: Jan. 2, 1973

[21] Appl. No.: 320,081

[52] U.S. Cl. .......... 340/172.5
[51] Int. Cl. .......... G06f 11/04, G08b 29/00
[58] Field of Search .......... 340/172.5

[56] References Cited

UNITED STATES PATENTS

| | | | |
|---|---|---|---|
| 3,461,434 | 8/1969 | Barton et al. | 340/172.5 |
| 3,533,065 | 10/1970 | McGilvray et al. | 340/172.5 |
| 3,546,677 | 12/1970 | Hauck | 340/172.5 |
| 3,548,384 | 12/1970 | Barton et al. | 340/172.5 |
| 3,564,506 | 2/1971 | Bee et al. | 340/172.5 |
| 3,566,364 | 2/1971 | Hauck | 340/172.5 |
| 3,576,541 | 4/1971 | Kwan et al. | 340/172.5 |
| 3,593,312 | 7/1971 | Barton et al. | 340/172.5 |
| 3,704,363 | 11/1972 | Salmassy et al. | 340/172.5 |
| 3,725,876 | 4/1973 | Hauck | 340/172.5 |

*Primary Examiner*—Raulfe B. Zache
*Assistant Examiner*—Jan E. Rhoads
*Attorney, Agent, or Firm*—Christie, Parker & Hale

[57] ABSTRACT

A programmable data processing system includes a memory and a stack organized data processor which executes procedures stored in the memory and stacks records of execution of the various procedures into stack storage areas in the memory. Signalling means produce interrupt signals including interrupt signals indicating a system failure. The data processor is responsive to a plurality of time spaced-apart interrupt signals for recursively using a primary interrupt handling procedure. That is, each execution of the primary interrupt handling procedure is interruptable. The record of execution of the primary interrupt handling procedure is stacked into whichever stack area happens to be allocated to the interrupted procedure. In the event of particular types of system failures, each time the data processor attempts to use the primary interrupt handling procedure, an interrupt signal is produced and data processor again attempts to use the primary interrupt handling procedure. An up-down counter records the number of successful and unsuccessfully attempted recursive uses of the primary interrupt handling procedure. After the up-down counter reaches a predetermined count, the data processor terminates attempting to use the primary interrupt handling procedure and begins to execute a secondary interrupt handling procedure.

16 Claims, 8 Drawing Figures

PATENTED AUG 6 1974 SHEET 2 OF 7 3,828,324

FAIL-SOFT INTERRUPT SYSTEM FOR A DATA PROCESSING SYSTEM

BACKGROUND OF THE INVENTION

1. Field of the Invention

This invention relates generally to methods and apparatus for data processing systems and particularly to a fail-soft interrupt handling system.

2. Description of Prior Art

In a programmable data processing system, a memory stores a machine language program, input data, data in the nature of intermediate results, and output data. A data processor executes the machine language program in a series of steps and in doing so stores the intermediate results and output data into the memory.

The prior art B5000, B5500, and B6500 data processing systems sold by Burroughs Corporation, the assignee of this invention, are programmable by machine language programs that are arranged in program segments each comprising a plurality of program operators. The machine language programs are compiled from other programs written in higher level programming languages such as ALGOL 60. Special purpose programs called compilers are used for this purpose. The compilers produce program segments that are coded to be re-entrant. This means, among other things, that the program operators are not modified during their execution.

Each of the above-mentioned prior art data processing systems includes a data processor having a stack mechanism. In combination, the re-entrant coding of program segments and the provision of a stack mechanism facilitates the execution of programs wherein procedures are used recursively. An explanation of the B5000 stack mechanism and the manner in which this stack mechanism facilitates the execution of programs wherein procedures are used recursively is contained in a book entitled RECURSIVE TECHNIQUES IN PROGRAMMING by D. W. Barron, published in 1968 by American Elsevier Publishing Company, Inc. Also, important features of the stack mechanism provided in the B6500 system are disclosed in U.S. Pat. Nos. 3,461,434, 3,546,677, and 3,548,384.

A feature of the prior art B6500 system resides in its ability to call an interrupt handling procedure recursively. Execution of the interrupt handling procedure itself is interruptable, and a plurality of successive interrupt conditions can be recognized and handled with dispatch by a single copy of the re-entrant code forming the interrupt handling procedure. Another feature of this prior art data processing systems resides in the ability of data processors within the system to be simultaneously executing the same interrupt handling procedure. Thus, there is no master/slave relationship between processors as existed in earlier prior art multiprocessor systems, and, of course, there is no inefficient suspension of operation of a slave processor while a master processor handles an interrupt condition.

A latent problem exists in a data processing system having such means for recursively processing interrupt conditions. It sometimes occurs, owing to a failure in a part of the memory for example, that the data processor cyclically attempts but fails to use the interrupt handling procedure. Each time the data processor attempts to use the interrupt handling procedure an interrupt signal is produced, and the data processor again attempts to use the interrupt handling procedure. This had led to an endless loop that could be stopped only by manual intervention. Moreover, before the data processor begins to use the interrupt handling procedure, the stack mechanism accumulates several words into the memory. The purpose of doing this is to make available to the interrupt handling procedure such information as parameters identifying the type of interrupt condition prevailing and return point information indicating where the execution of the interrupted procedure should proceed from after completion of the interrupt condition processing. Thus, each time the data processor fruitlessly attempts but fails to use the interrupt handling procedure, several more words, which will never be used, are accumulated into the memory. The net result of this is that the whole memory is overwritten, and all the information which has been stored therein for later use will be destroyed.

Another approach taken in the prior art to the handling of interrupt conditions is disclosed in U.S. Pat. No. 3,492,654. A data processor in accordance with the teachings of this patent has a normal mode, a control mode A, and a control mode B. While in its normal mode, the processor executes object programs. While in its control mode A, the processor executes interrupt handling procedures located in a first table. While in its control mode B, the processor executes special interrupt handling procedures of a remedial nature which are located in a second table.

The processor includes an interrupt register and an interrupt mask register, each having a plurality of flip-flops corresponding to different interrupt conditions. Each interrupt signal received by the processor causes a selected one of the flip-flops in the interrupt register to be set. The state of the corresponding flip-flop in the interrupt mask register determines whether the processor will recognize or ignore the interrupt condition. In a two processor system the two interrupt mask registers are set so that disjoint interrupt handling subsystems are formed.

Various modes of the processor are entered in the following manner. The normal mode is entered in response to an interrupt return signal that is produced upon successful completion of an interrupt handling procedure. Control mode A is entered only from the normal mode in response to a recognized interrupt signal. When control mode A is entered, execution of the object program is interrupted. Control mode B is entered from control mode A in response to the first interrupt signal recognized while the processor is in control mode A. When control mode B is entered, execution of the control mode A interrupt table is terminated and is never reentered at the point of termination. Instead, the control mode A interrupt table is only entered at its beginning and then only from the normal mode. Thus the interrupt system described in this patent is not subject to the latent problem described above concerning a fruitless attempt to enter recursively an interrupt handling procedure, but, on the other hand, it does not possess the computing power resulting from the ability to enter an interrupt handling procedure recursively.

SUMMARY OF THE INVENTION

The present invention is directed to a fail-soft interrupt system for a data processing system using a secondary interrupt handling procedure which is called into play to terminate recursive use or attempted use of a primary interrupt handling procedure resulting from a system failure. The invention provides for recognizing a plurality of successive interrupt conditions and for entry and re-entry into the same primary interrupt handling procedure. The primary interrupt handling procedure is coded to be re-entrant and therefore the invention has the advantages attendant to re-entrant coding techniques, such as saving of memory space, simultaneous use by a plurality of processors of the same procedure and the like. The invention further provides for the elimination of the above-described latent problem of fruitlessly attempting to enter recursively the primary interrupt handling procedure.

The apparatus of this invention is embodied in a programmable data processing system. A memory in the system stores primary and secondary interrupt handling procedures. Signalling means produce a plurality of interrupt signals. Each interrupt signal indicates the existence of one of a plurality of interrupt conditions. In response to a plurality of time spaced-apart interrupt signals, a data processor recursively uses the primary interrupt handling procedure to process the interrupt conditions. Among the possible interrupt conditions is one wherein there is a failure as a result of which the data processor cyclically attempts but fails to use the primary interrupt handling procedure. Each time in the cycle that the data processor attempts to use the primary interrupt handling procedure, an interrupt signal is produced and the data processor again attempts to use the primary interrupt handling procedure. Means are provided for terminating attempted use of the primary interrupt handling procedure and for causing the data processor to execute the secondary interrupt handling procedure. The terminating means is responsive to the coincidence of an interrupt signal and a state indication produced by an interrupt machine level register means while it is in a predetermined higher order state. The level register means is settable to assume any one of a plurality of ordered states and provides a corresponding plurality of state indications. Means are provided for setting the level register means to assume its lowest order state when no interrupt conditions continue to exist. Means are provided for setting the level register means to the predetermined higher order state after a succession of interrupt signals are produced, and for each of the succession the data processor has failed to use the primary interrupt handling procedure. The setting means includes means responsive to each interrupt signal for setting the level register means to assume a state having a higher order than its state immediately prior to the interrupt signal.

Preferred features of an embodiment of this invention include the following. The memory means includes a plurality of memory modules wherein the primary and secondary interrupt handling procedures are stored in different modules. Thus a failure of a type which prevents reading the memory module storing the primary interrupt handling procedure does not prevent the data processor from executing the secondary interrupt handling procedure. An important preferred feature relates to programmatic interrogation and control by the primary interrupt handling procedure of the state of the level register means. Thus, in a preferred embodiment, the primary interrupt handling procedure includes program operators containing address fields pointing to locations storing stack words. One such program operator is used to store into the stack the state of the level register means. In the light of this information provided by programmatic interrogation of the level register means along with other information similarly available to it, the primary interrupt handling procedure takes appropriate courses of action. For example, another program operator may be executed which causes the level register means to be set to a different state.

BRIEF GENERAL DESCRIPTION

Figure 1:
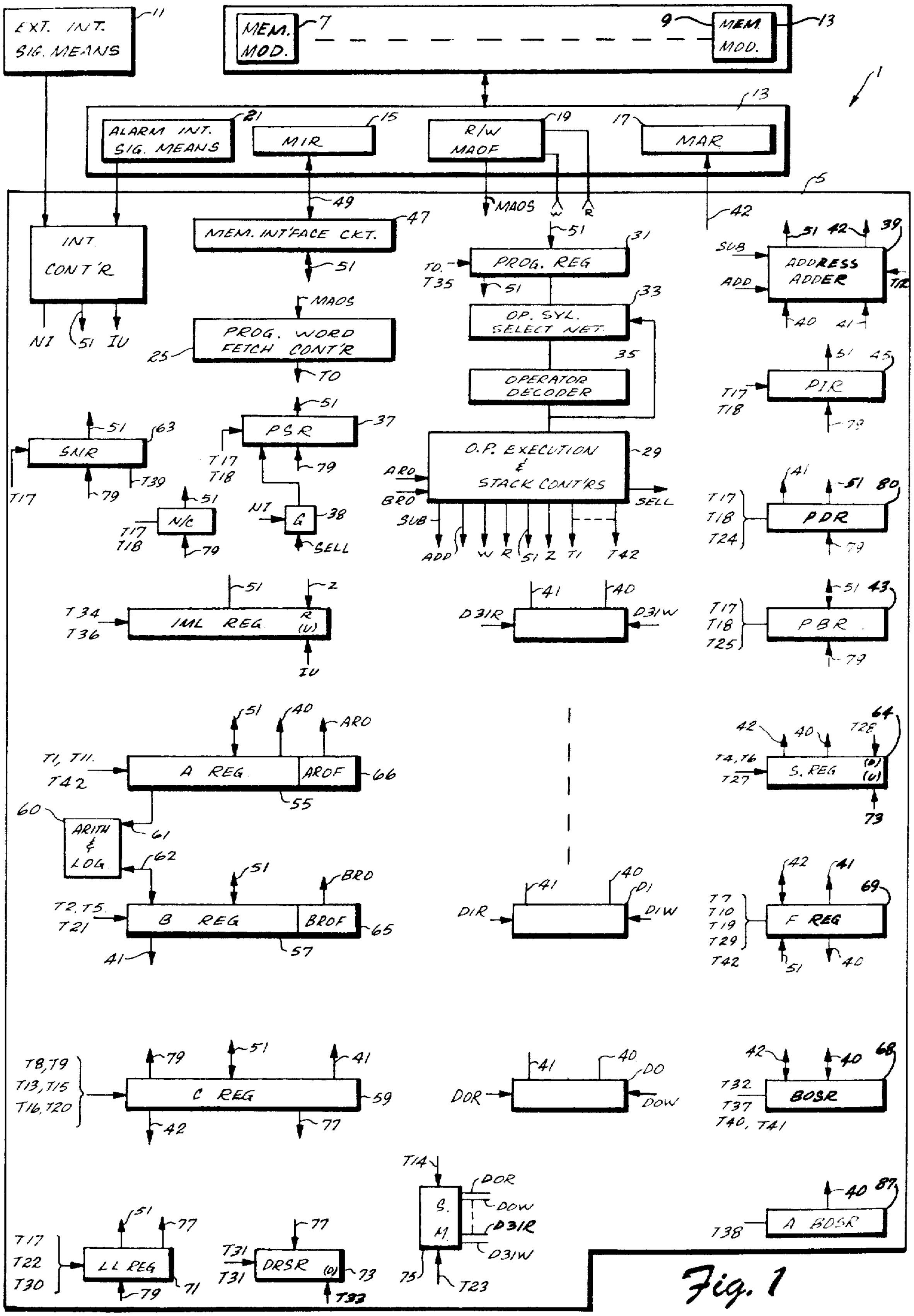
FIG. 1 is a block diagram of a data processing system embodying the present invention.

This general description outlines primarily with reference to FIG. 1 the basic organization of an embodiment of this invention. A detailed description follows.

A programmable data processing system 1 includes a memory 3 and a stack organized data processor 5 which executes procedures stored in the memory and stacks records of execution (see FIG. 3) into stack storage areas in the memory. Signaling means produce a plurality of interrupt signals, each indicating the existence and identifying the type of various interrupt conditions. For example, an alarm interrupt signaling means 21 produces an alarm interrupt signal to indicate that there has occurred a failure that prevented an attempted data transfer between the data processor and the memory.

The data processor is responsive to a plurality of time spaced-apart interrupt signals for using the primary interrupt handling procedure recursively. That is, each execution of the primary interrupt handling procedure is interruptable.

In the event of particular types of failure, each time the data processor attempts to use the primary interrupt handling procedure, an alarm interrupt signal is produced. For example, a failure sometimes occurs in a part of the memory that stores the initial program word (see FIG. 3) of primary interrupt handling procedure. In this event, the data processor attempts to use the primary interrupt handling procedure but is unable to do so. Also, as a result of the attempt, an alarm interrupt signal is produced, and the data processing again attempts to use the primary interrupt handling procedure. In prior art data processors this type of system failure has led to an endless loop that could be stopped only by manual intervention.

This problem is overcome in the present invention by a process including the steps of recording a count in an interrupt machine level register (IML85) so that when the data processor makes a number of unsuccessful attempts to use the primary interrupt handling procedure, the IML85 register reaches a predetermined count or state; detecting the coincidence of an interrupt signal and the predetermined state of the IML85 register; and responsive to such detection, terminating the attempt to use the primary interrupt handling procedure and beginning the execution of the secondary interrupt handling procedure.

DETAILED DESCRIPTION

Figure 2:
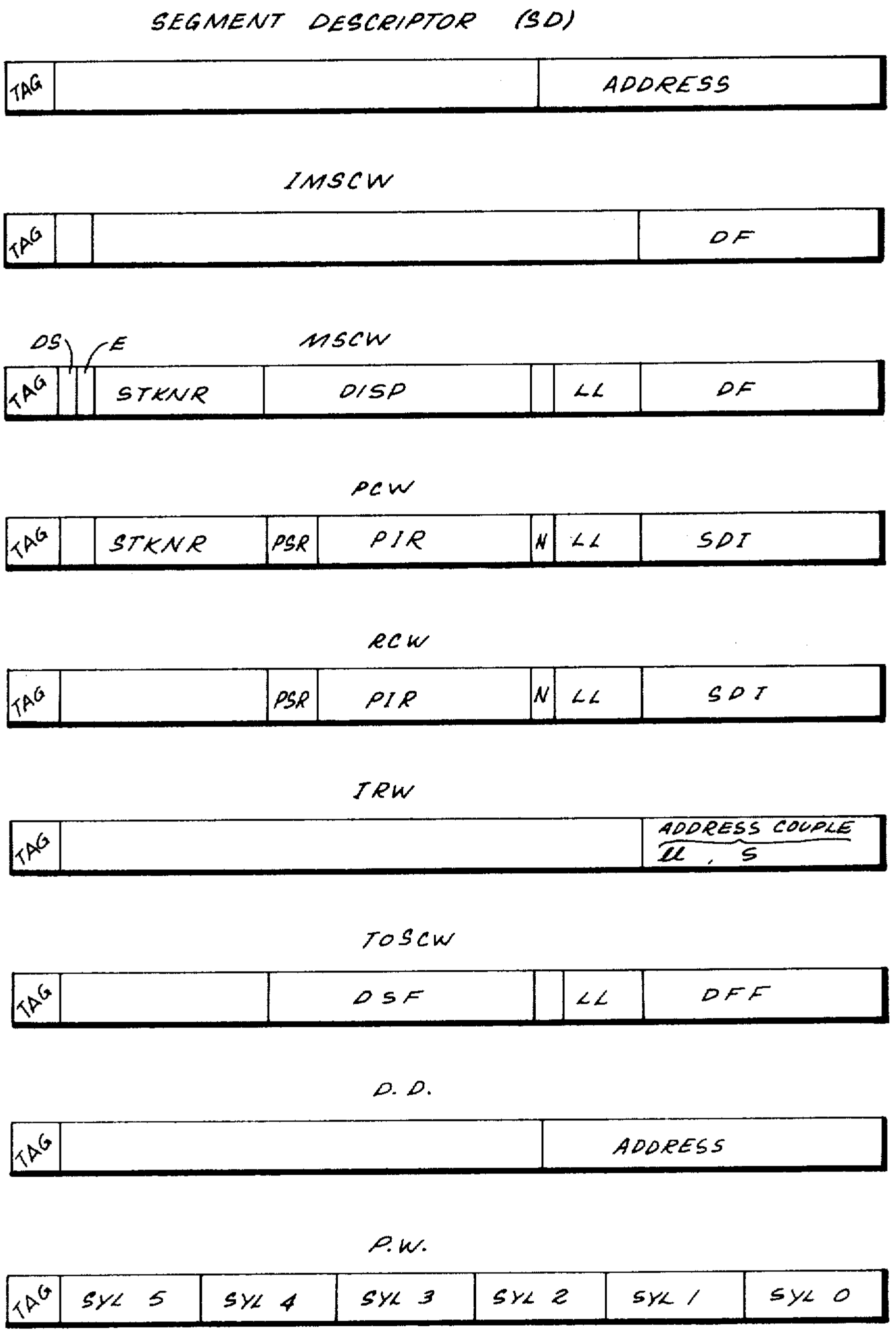
FIG. 2 is a sketch showing the format of each of a plurality of different types of words used in this data processing system.

The memory 3 has a plurality of addressable locations for storing words of various types. The format of each of a plurality of these words is shown in FIG. 2. Preferably, each type of word has an identification tag field in accordance with the teachings of the U.S. Pat. No. 3,593,312 entitled DATA PROCESSOR HAVING OPERAND TAGS TO IDENTIFY AT SINGLE OR DOUBLE PRECISION and assigned to the assignee of this invention. A program word includes six fields (each eight bits in length) which are denominated syllables. A program operator (which is substantially the same thing as a program instruction) comprises one or more of the syllables. A relatively simple program operator such as one ordering the processor to add two operands together consists of a single syllable. On the other hand, a program operator can be so complex that it can be fully represented only by linking together syllables from a plurality of program words. The term program operator is used instead of the possibly more familiar term program instruction for the following reason. In many prior art systems, program instructions have included fields that are modified during the course of their execution. No such modification is made to program operators used in this invention.

In this description, several other terms and expressions will be used that may not be known to those who are not familiar with the prior art B6500 system and the above-identified patents disclosing its stack mechanism. The term "pointer" means an address field from which the absolute address of a memory location can be derived. Thus the term pointer subsumes direct addresses, relative addresses, and indirect addresses. The expression "a register points to" means that the register stores a pointer. The term "addressably contiguous location" relates to the one-to-one correspondence that exists between an ordered set of addresses and a set of memory locations. Two addresses differing incrementally from each other identify two addressably contiguous locations. Moreover, since a plurality of program operators can be packed together in a single location, the term "addressably contiguous fields" will be used. The term "program string" means a plurality of program operators that are stored in addressably contiguous fields.

In the same manner as the B6500 system, a compiler translates a program written in a high level program language into a machine language program comprising a plurality of program segments.

The basis on which the compiler segments the program relates to the block structure of programming languages such as ALGOL. A program written in ALGOL is arranged in blocks. A block comprises one or more statements that order certain actions, declarations of identifiers, and the bracketing terms BEGIN and END, which mark the boundaries of the block.

One purpose of a block is to introduce a new level of nomenclature by means of the declarations of identifiers. A new level of nomenclature is introduced by nesting one block within another block. Such nested blocks are related to each other as local and global blocks. Under the ALGO rules, an identifier can have the same meaning within a local block as it has within its global block. On the other hand, the same identifier has a completely different meaning within the local block when the identifier is re-declared therein. This is a powerful feature of the ALGOL language because it permits a programmer to use convenient, suggestive identifiers within the block he is writing without fear that he may be inadvertently affecting some other block.

A lexicographical level is assigned to each block of a program written in ALGOL. For example, the outer block of a program is assigned a first lexicographical level, for example, 0, the innermost block is assigned a higher lexicographical level, for example 4. In this case, there are intervening blocks that are sub-blocks of the outer block and at the same time global blocks of the innermost block. These intervening blocks are assigned lexicographical levels 1, 2, and 3. Other blocks may be nested within the outer block that are not global to the innermost block. Accordingly, ALGOL permits the arrangement of programs into a tree structure. The relative lexicographical levels assigned to the various blocks are static in that they are determined at the time the program is written.

One of the permissible declarations in ALGOL is the declaration PROCEDURE. A procedure is akin to a subroutine. In ALGOL, a procedure can be a program block (in which case declarations will be made in it), or merely a compound statement (i.e., a collection of assignment statements bracketed by the terms BEGIN and END). The declaration of a procedure is to be distinguished from a call on a procedure. Its declaration is in the nature of a definition; that is, it includes a list of steps. A call on the procedure orders the procedure to be executed at a particular point in the program and identifies the parameters the procedure is to work with. A key feature of ALGOL resides in the rules that permit recursive use of the procedures. For example, a procedure can be defined to work with a procedure as a parameter, and the procedure may be called and have itself passed to it as a parameter.

As in the B6500 system, the compiler translates each block of an ALGOL program into a program code segment. While the rules of ALGOL distinguish between procedures that are merely compound statements and procedures that are blocks, the compiler treats each procedure as if it were a block. Owing to the close correspondence that exists between a high level language procedure and a machine language program code segment, hereinafter where no confusion will result, these two terms will be used interchangeably.

Each of a plurality of the code segments includes a plurality of intermediate program operators, and an initial and a final program operator that are to be executed before and after, respectively, all intermediate program operators in any complete execution of the program code segment. The final program operator of each segment is either an EXIT operator a RETURN operator. The compiler translates the bracket term END appearing at the end of a procedural compound statement or procedural block into the RETURN operator and translates the bracket term END appearing at the end of all other program blocks into the EXIT operator. The compiler translates an ALGOL action statement ordering a procedure to be performed into a calling sequence of program operators. The last program operator in the calling sequence is denominated an ENTER operator. In executing the ENTER operator, the data processor reads out the initial program operator of the code segment corresponding to the called procedure. When this occurs, the program segment is said to be entered.

Memory module 7 stores program procedures of a master control program (MCP). The MCP is the type of program often called either an executive or a supervisory program. Programs such as the MCP are usually provided by the computer manufacturer. The MCP has many functions such as scheduling other programs for execution, allocating storage space, and the like. For this reason, the MCP is quite complex and includes a multiplicity of different procedures. To store the entire MCP in the modular memory would consume a large number of the available locations. Accordingly, only a portion of the MCP is stored in the modular memory while the data processing system is in typical operation. Other portions of the MCP are stored elsewhere in bulk storage memories such as disc file memories. On a when needed basis, these other portions are transferred from bulk storage into the modular memory.

Preferably, one portion of the MCP is substantially continuously stored in the modular memory. This portion is a primary interrupt handling procedure (PIHP). The function of the PIHP is to program the data processor to process the various types of interrupt conditions. The system 1 includes signalling means for producing a plurality of interrupt signals, each indicating the existence and identifying the type of various interrupt conditions. For example, an external interrupt signalling means 11 provides external interrupt signals to indicate to the data processor the existence of interrupt conditions arising from the operation of other units in the system 1. As in the above-mentioned B6500 system, the external interrupt signals are produced by circuitry contained in an input/output multiplexor unit (not shown).

A list of words denominated a stack trunk is also stored on a substantially continuous basis in the modular memory. The stack trunk is a table of information used primarily in executing the MCP. U.S. Pat. No. 3,546,677 is directed, among other things, to the use of a descriptor word in such a stack trunk to reference other stacks stored in the memory which are linked back to the stack trunk to form a tree structured stack.

A memory control unit (MCU13) is connected between the processor 5 and the modular memory. A memory information register (MIR15) is contained in MCU13. MIR15, like other registers described hereinafter, includes a plurality of bit storing devices such as flip-flop circuits (not individually shown). Each such flip-flop circuit includes conventional input gating and output gating circuitry. In each register, such input gating circuitry is responsive to control signals described hereinafter to store into the bit storing devices of the register data signals carried by groups of signal leads called buses. And, in each register, such output gating circuitry is responsive to control signals to gate to an associated bus data signals stored in the bit storing devices of the register. By way of example, MIR15 in the preferred embodiment includes 51 bit-storing devices for storing 51-bit wide words.

A memory address register (MAR17) is contained in MCU13. By way of example, MAR17 in the preferred embodiment includes 20 bit-storing devices for storing 20-bit wide absolute addresses. Each time a word is to be transferred between the processor and the modular memory, an absolute address is stored into MAR17. In response, MCU13 accesses the memory location identified by the absolute address and a word is transferred between the accessed memory location and MIR15.

MCU13 includes conventional read/write control circuitry including signalling means (MAOF19) which provides a signal (MAOS) that indicates a memory access request has been acknowledged and that MIR15 contains the word involved in the memory access. It sometimes occurs (owing to a failure in a memory module, for example) that MCU13 is unable to transfer a word between MIR15 and an addressed location. Accordingly, provided in MCU13 is an alarm interrupt signalling means 21 that produces an alarm interrupt signal.

In general, the processor 5 is constructed in accordance with the teachings of U.S. Pat. No. 3,566,364 entitled DATA PROCESSOR HAVING OPERATOR FAMILY CONTROLLERS and assigned to the assignee of this invention. Thus, that portion of the processor's circuitry involved in forming timing and control signals is partitioned into a plurality of controllers. Among these are a program word fetch controller (FC25), an interrupt controller (IC27), and the operator execution and stack controllers (OEC29). While not specifically shown, each controller includes a sequence counter, a network decoding the state of the sequence counter, and a plurality of gates controlled by signals formed by the decoding network and other circuits in the processor. These gates produce the timing and control signals required for micro-operations and for controlling the state of the sequence counter.

A program register 31 stores each program word after it has been fetched from the modular memory. Hereinafter, the program word stored in the program register is referred to as the current program word. An operator syllable select network 33 and an operator decoder 35 cooperate to decode the current program operator in the program word. The first syllable of each program operator indicates how many syllables make up the program operator. Accordingly, the output of the operator decoder network 35 is fed back to the operator syllable select network 33 so that it can gate the appropriate number of syllables to the decoder. The output of the operator decoder 35 is also coupled to OEC29.

A program syllable register (PSR37) points to the first syllable of the program operator to be executed immediately after the current operator. At the completion of the execution of any program operator, OEC29 provides a syllable execution complete level (SECL). A gate 38 is coupled to receive SECL. Under control of an NI signal from the IC27, the gate 38 responds to SECL to update PSR37 to point to the first syllable of the next program operator.

Each program word is fetched from a location in the modular memory 3. An address adder 39 calculates an absolute address for each program word to be fetched. Input buses 40 and 41 carry information to the address adder. Each absolute address of a program word calculated by the address adder is gated to a bus 42 coupling the processor 5 to MAR17. A program base register (PBR43) and a program index register (PIR45) provide a base and a relative address respectively that the address adder adds together to form the absolute address of the program word. After MCU13 has obtained the program word from the addressed location, the MAOS signal indicates that MIR15 contains a program word. Memory interface circuitry 47 in the processor 5 is coupled to MIR15 by bus 49. This circuitry includes the terminating impedances and amplifiers commonly used to ensure reliable receipt of digital data signals at high pulse repetition rates. The memory interface circuitry applies the word received from MIR15 to a bus 51. When the word carried by bus 51 is a program word, the fetch controller (FC25) responds to MAOS to produce a control signal TO which gates the program word into the program register.

Each word (other than a fetched program word) applied by memory interface circuitry 47 to the bus 51 may be gated into an A register 55, a B register 57, or a C register 59. Any word stored in any of these three registers can be gated onto the bus 51 for transfer into MIR15 and be stored into the modular memory.

In addition to carrying a word involved in a memory transfer, the bus 51 from time to time is used to carry a word between two registers in the processor. For example, a control signal T1 gates a word in the A register to the bus 51. A control signal T2 gates into the B register a word carried by the bus 51. Accordingly, when control signals T1 and T2 are produced simultaneously, a word in the A register is transferred to the B register. This is expressed as B ← A. The specific action caused by the individual control signal T1 is expressed as 51[50:51] ← B[50:51]. This means that the bits stored in all 51 bit storing devices of the B register, which are numbered 0 through 50, are gated to corresponding signal leads of the bus 51. Table II given at the end of this description lists the control signals described hereinafter and describes the action each causes.

During execution of a program string, information items in the nature of intermediate results are produced. Such information items or intermediate-result words must be temporarily stored until they are needed in a subsequent step. The task of storing such intermediate-result words involves certain subtasks. For example, memory space must be allocated for storing them and then be de-allocated after they are no longer needed. Also, they must be stored in such a way that they can be located when they are needed.

The machine language programs for the system 1 are compiled in such a way that the intermediate-result words are generally needed in an order reversed from the order in which they are produced. This is a consequence of the use of Polish notation in the expression of assignment statements. An assignment statement expressed in Polish notation is parenthesis-free and consists of a sequence of operands and operators. A convention is established whereby each arithmetic operator operates on two immediately preceeding operands. Consider, for example, the Polish notation string ABC + X. The two operands preceding the plus sign are B and C and therefore the plus sign indicates that B and C are to be combined to form a single new operand (B + C). Now the two operands preceding the multiply sign become (B + C) and A. Therefore, the multiply sign indicates that two operands A and (B + C) are to be combined to form a single new operand (A) × (B + C).

A machine language program corresponding to this exemplary Polish notation expression includes a string of program operators ordering the processor 5 to obtain the operands A, B, and C, in that order. These operands must be temporarily saved. The machine language program also includes a program operator ordering the processor to add together the two most recently accumulated intermediate-result words (i.e., C and B). Finally, a program operator orders the processor 5 to multiply together the remaining accumulated result words (i.e., A and B + C).

The data processor 5 includes a stack mechanism for facilitating the task of accumulating such intermediate result words. In the remaining description, an intermediate result word will be referred to simply as a "stack word."

Stack words such as operands stored in the A register 55 and the B register 57 can be gated to an arithmetic and logical unit A/L60. Buses 61 and 62 carry to the inputs of A/L60 the words gated out of the A and B registers respectively. Consider, for example, an ADD operator. Before the execution of an ADD operator, an operand will be stored in the A register and an operand will be stored in the B register. In response to the ADD operator, these two operands are gated to A/L60 where they are added together. The sum produced by A/L60 is carried by the bus 62 and is stored into the B register.

The stack mechanism accumulates stack words in a stack storgage means. The accumulated stack words form a linked list called a tree-structured stack. The stack storage means includes a plurality of addressable locations in the modular memory 3 and includes the A and B registers.

The tree-structured stack is made up of a plurality of stacks, one of the stacks being the stack trunk. Each stack is assigned a stack number. The modular memory 3 stores an array of descriptors which form a stack vector. Each descriptor in the stack vector points to a different one of the stacks. The stack trunk includes a descriptor which points to the stack vector.

At the base of each stack there is either a top of stack control word (TOSCW) or an operand word containing an identification field (I.D.) that indicates that a data processor is accumulating information in that stack. It should be noted that while only one data processor is shown in the block diagram of FIG. 1, in many embodiments of the present invention there are a plurality of data processors.

A stack that has such an operand word at its base rather than a TOSCW is denominated an active stack. A stack that has a TOSCW at its base is denominated an inactive stack. The data processor 5 includes a stack number register (SNR63) that stores the number assigned to the active stack (i.e., the one having an I.D. field indicating data processor 5).

Each stack has a top of stack word. For an active stack, the top of stack word can be stored in either the A register, the B register or in a location in the modular memory. A portion of the active stack (i.e., its stack words, other than the words stored in either the A register and the B register) will be referred to as the memory stack. When the A register and the B register each contain a stack word at a time when another stack word is to be accumulated, an operation called a push-down operation is peformed. This causes the word in the B register to be written into a location in the modular memory, and causes the word in the A register to be transferred to the B register. As a result of the push-down operation, the A register is available to store the stack word to be accumulated, which becomes the new top of stack word. Also, as a result of the push-down operation, the word written into the modular memory from the B register becomes what is called the top of memory stack word. Each push-down operation causes a stack word to be added to the memory stack or, equivalently, to increase the total number of memory stack words.

The stack mechanism reads the top of memory stack word from the modular memory and stores it into the B register in what is called a pop-up operation. Each pop-up operation causes a stack word to be removed from the memory stack or, equivalently, to decrease the total number of memory stack words.

Thus the memory stack expands as a result of push-down operations and contracts as a result of pop-up operations.

The stack mechanism includes means for keeping track of where the top of stack word resides. To this end, the stack mechanism includes an S register 64 which points to the memory location which contains the top of memory stack word. This is the word which was added to the memory stack by the last or, equivalently, most recent push-down operation and which has not yet been removed from the memory stack by a pop-up operation. Also, to this end, the stack mechanism includes occupancy indicating means associated with the A register and the B register. When the top of stack word is stored in B register 57, a flip-flop (BROF65) associated therewith is in a '1' state and provides a 1 as a BRO signal. At the time, a flip-flop (AROF65), associated with A register 55, is in a '0' state and provides a 0 as an ARO signal. When the top of stack word is stored in the A register 55, ARO and BRO each equal 1. When the top of stack word is stored in neither register, but instead is stored in the modular memory, ARO and BRO equals 0.

The stack of words is to be distinguished from a list accumulated on a pure last-in, first-out (LIFO) basis. The term "push-down" is often used to refer to a store that operates on a pure LIFO basis. Barron, in his above-identified book, describes a stack as follows: "The term stack is usually applied to such a store when, in addition to accessing the item at the top, items in the interior may be consulted. More precisely, a stack is a store which works on the push-down principle as far as adding or removing items is concerned, and in which items not at the head can be accessed by quoting their position relative to one of the small number of pointers."

Such a "small number of pointers" are provided in the data processor 5 by 32 display registers D0, D1 . . . and D31 (not all shown), a base of stack register (BOSR68) and an F register 69. Each of the display registers points to a control word denominated a mark stack control word (MSCW). The F register also points to a control word which may be either an incomplete mark stack control word (IMSCW) or an MSCW. The formats of the IMSCW and the MSCW are shown in FIG. 2.

Each MSCW is inserted into the stack to mark the beginning of a stack area where the record of execution of a procedure begins. Each MSCW includes an LL field that indicates the lexicographical level of the procedure whose record of execution begins with that MSCW. An LL register 71 is provided in the data processor for storing the lexicographical level value of the procedure under execution.

U.S. Pat. No. 3,461,434 entitled STACK MECHANISM HAVING MULTIPLE DISPLAY REGISTERS and assigned to the assignee of this invention, describes in detail the manner in which the pointers stored in the display registers are used in combination with particular program operators to derive the absolute addresses of stack words. As in the system described in this patent, the data processor 5 includes a display register selection register (DRSR73) and a selection matrix (SM75) for addressing the display registers. U.S. Pat. No. 3,548,384 entitled PROCEDURE ENTRY FOR A DATA PROCESSOR EMPLOYING A STACK and assigned to the assignee of this invention, describes in detail the manner in which the pointers are stored into the display registers.

Consider now the types of words stored in a stack. Table I gives an explanation of the various symbols used to identify the fields within the words shown in FIG. 2.

TABLE I

| Symbol | Description of Symbol |
|---|---|
| TAG | Identifies type of word |
| ADDRESS | This is a complete absolute address. In a segment descriptor, this field points to the beginning of a program segment. In a data descriptor, this field points to the beginning of an array. |
| DF | A difference value indicating the number of stack words accumulated during execution of a program segment. The address of the word in which the field is found minus this field gives the address of an MSCW. The DF fields are used to link the MSCWs together to provide a stack history list. Specifically, each DF field links the word of which it is a part to the historically previous IMSCW or MSCW. |
| DISP | A displacement field or increment value which when added to a base address gives the address of an MSCW. The base address used with the DISP field in a particular MSCW is the address of the location allocated to store the TOSCW for the stack assigned the same number as the STKNR field of the particular MSCW. The DISP fields are used to link the MSCWs together to form an address environment list. Specifically, each DISP field links the MSCW of which it is a part to an MSCW which has an incrementally smaller LL field and which marks the record of execution of a global block. |
| LL | A value indicating the lexicographical level of a program segment. In an MSCW, this field indicates the lexicographical level of the program segment whose record of execution is marked by the MSCW. In an RCW, this field indicates the lexicographical level of the program segment indicated by other fields in the RCW. |
| STKNR | A stack number field which is a relative address. It is combined with the base address of a stack vector array to form the address of a data descriptor pointing to a stack. |
| DS | A different stack field. This field is examined while the display registers are being updated. When DS equals 0, the base address to be used in combination with the DISP field is already stored in BOSR68. When DS equals 1, the base address must be obtained through use of the STKNR field. |

TABLE I-Continued

| Symbol | Description of Symbol |
|---|---|
| SDI | A segment descriptor index. This is a relative address pointing to a segment descriptor. A one bit sub-field of SDI indicates whether the base address for this relative address is the address stored in D0 or the address stored in D1. |
| E | An environment indicator. This is a one bit field indicating whether the word of which it is a part is an IMSCW or an MSCW. |
| PIR, PSR | Values used for setting the PIR and PSR registers so that they point to the first program operator to be executed when control is transferred to a different program segment. |
| $ll,\delta$ | This is an address couple. The $ll$ part is the lexicographical level of a particular item and points to a particular display register. The $\delta$ part is an increment value or relative address. $\delta$ can be added to the address of the address stored in the display register pointed to by $ll$ to produce an absolute address. |
| DSF | A relative address which when added to the address of the TOSCW of which it is a part gives the address of the top word of that stack. |
| DFF | A relative address which when subtracted from the top word of a stack gives the address of the top-most MSCW in that stack. |
| SYL | This is a program syllable. |

Figure 4:
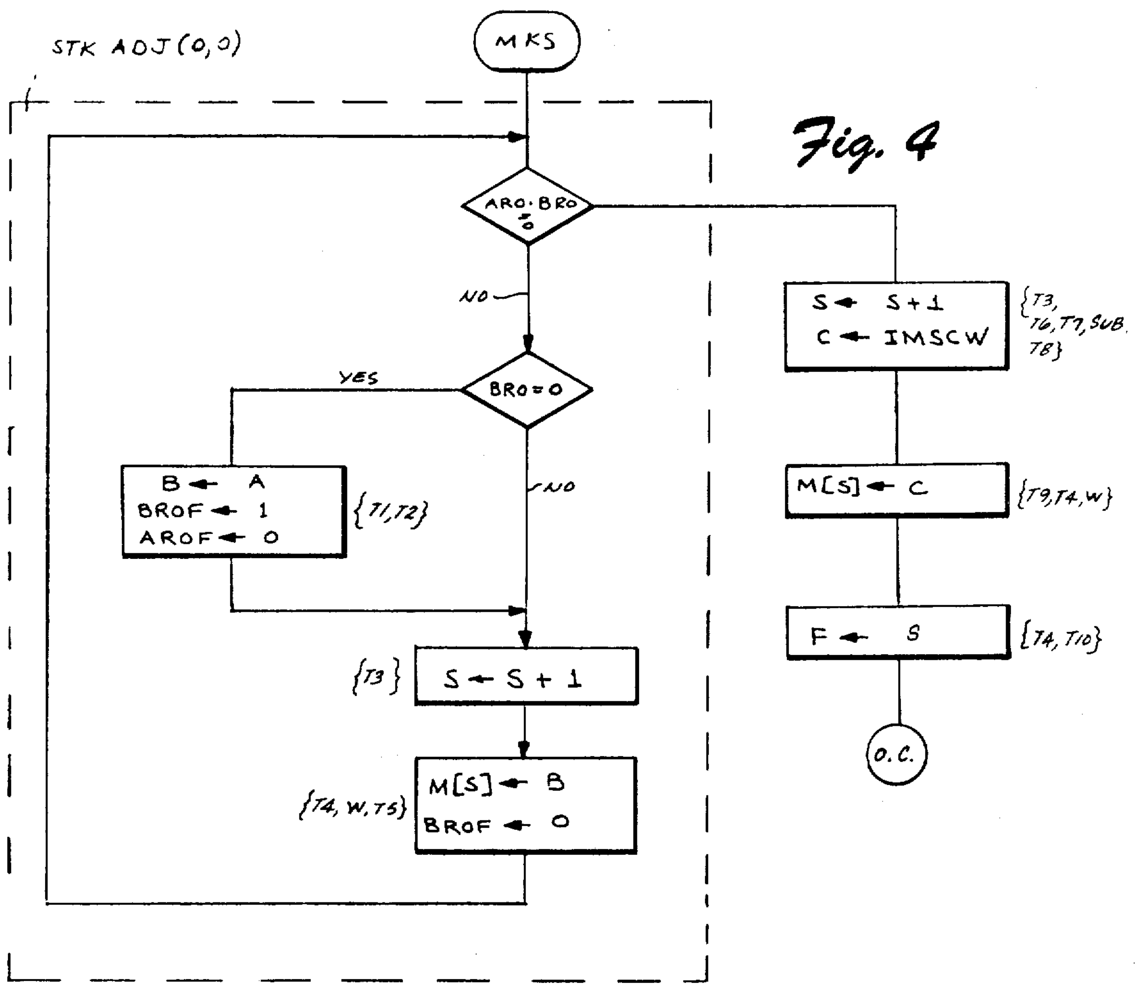
FIG. 4 is a flow chart showing the sequence of operation involved in storing into the modular memory an IMSCW, shown in FIG. 2.
Figure 5:
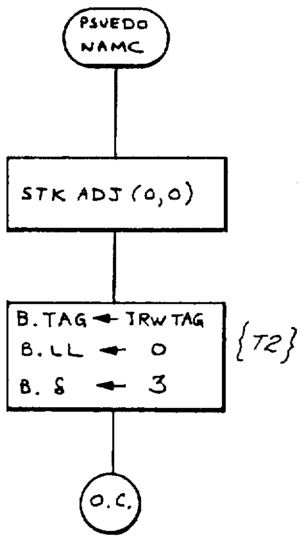
FIG. 5 is a flow chart showing the sequence of operation involved in storing into the modular memory an IRW, shown in FIG. 2.

The program operator repertory of system 1 includes program operators entitled value call (VALC), name call (NAMC), mark the stack (MKS), and the aforementioned ENTER, EXIT, and RETURN operators. The VALC operator and the manner in which it is executed is disclosed in detail in FIG. 3 of U.S. Pat. No. 3,546,677. Briefly, the VALC operator includes an address couple field that makes reference to a location within the stack and includes a field that orders OEC29 to cause a word within the referenced location to be brought up to A register 55. FIG. 5 shows the sequence of operation involved in executing the NAMC operator. Briefly, the NAMC operator includes an address couple field and includes a field that orders OEC29 to store this address couple field into a portion of A register 55 and to store an IRW tag into another portion of A register 55. In this manner, the NAMC operator causes an IRW to be placed at the top of the stack. FIG. 4 shows the sequence of operation involved in executing the MKS operator. Briefly, the MKS operator orders OEC29 to place an IMSCW at the top of the stack.

Figure 3:
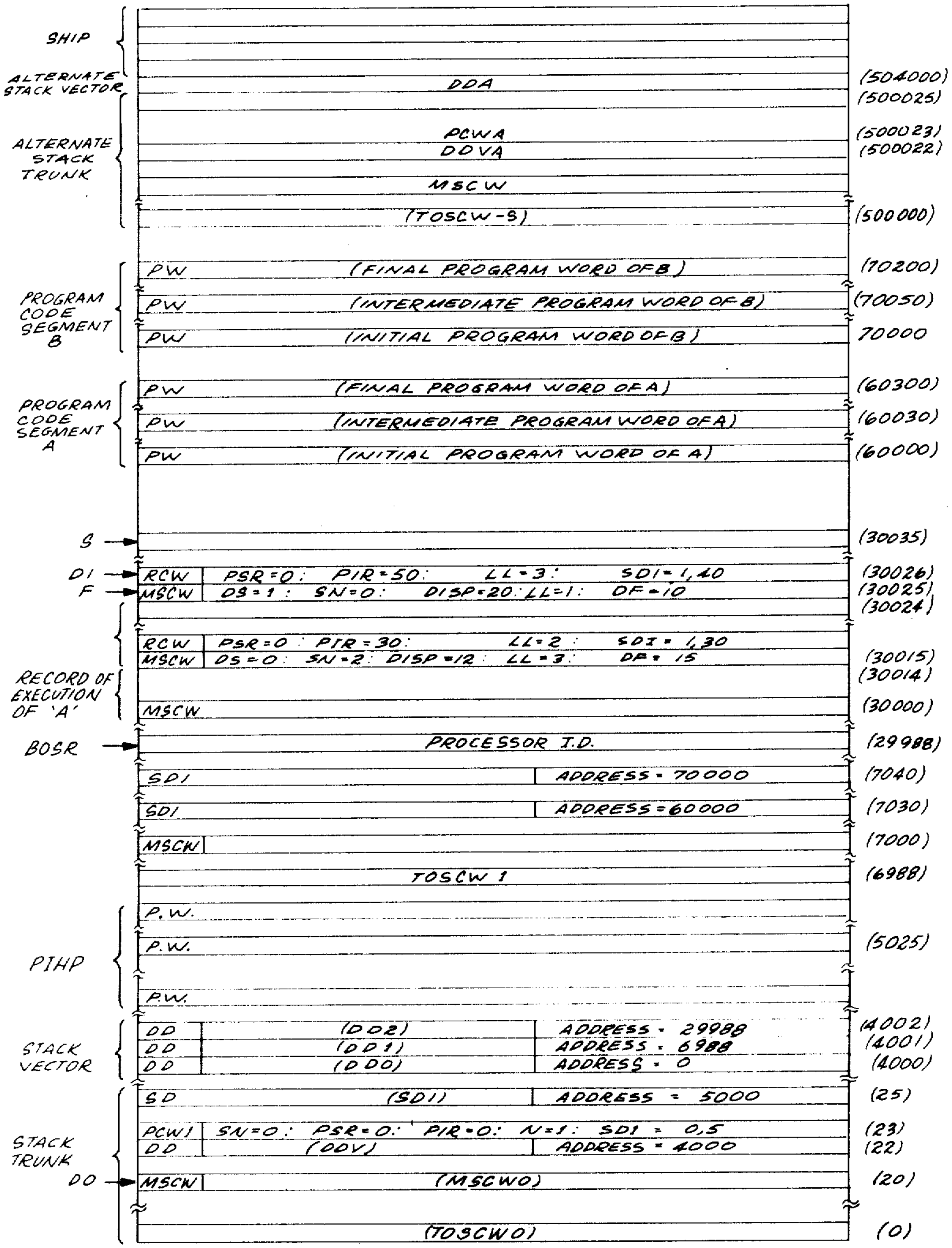
FIG. 3 is a sketch showing, for a particular example, the manner in which words are arranged in the modular memory of this data processing system.

Consider now FIG. 3 wherein each of a plurality of memory areas of the modular memory 3 is represented as a column. Each rectangle in the column represents an individual addressable location.

In FIG. 3, a letter or acronym and an arrow adjacent thereto pointing to a rectangle indicates that a register points to the represented memory location. For example, as shown in FIG. 3, the arrow adjacent the acronym D0 points to a rectangle labelled MSCWO. This means that display register D0 stores a pointer to a memory location an MSCW.

FIG. 3 illustrates a condition for a specific example of operation. Among other things, FIG. 3 illustrates a stack trunk, a stack vector array, a segment dictionary, and a job stack, each of which is described in U.S. Pat. No. 3,546,677.

The stack trunk (which is identical to the Control Table described in U.S. Pat. No. 3,546,677) has at its base a top stack control word (TOSCWO). FIG. 2 shows the format of a TOSCW. The stack trunk is stored in locations of memory module 7. In this example, TOSCWO is stored at a location having an address equal to 0.

Stored in the stack trunk are an MSCW (MSCWO), a data descriptor (DDV), A PCW (PCW1), and a segment descriptor (SD1). In this example, MSCWO is stored at a location having an address equal to 20. Display register D0 points to MSCWO. The absolute address of the location storing DDV is equal to the sum of 2 and the absolute address stored in display register D0, and, in this example, equals 22. DDV contains an address field that identifies the base address of the stack vector array. Accordingly, DDV is denominated the stack vector descriptor. In this example, this address field equals 4000. The absolute address of the location storing PCW1 is equal to the sum of 3 and the absolute address stored in display register D0, and, in this example, equals 23. PCW1 contains various fields giving information about the primary interrupt handling procedure (PIHP). Accordingly, PCW1 is denominated the PIHP PCW. The stack number field (SN) equals 0, thereby indicating that this PCW is stored in a stack assigned the number 0. The PSR and PIR fields each equal 0, thereby indicating that the initial program operator of the PIHP includes the first syllable of the program word stored at the base address of an array of locations storing the PIHP.

The N field equals 1, thereby indicating that PIHP is to be executed in control state rather than normal state. The SDI field has two parts (i.e., 0,5). The first part indicates that the second part is to be used as a relative address with respect to a base address given by display register D0 rather than with respect to a base address given by display register D1. In this example, this SDI field points to a location having an address equal to 25 and storing SD1 (the segment descriptor for PIHP). SD1 contains an address field equal to 5000.

The stack vector array has its base (at an address equal to 4000) a data descriptor (DD0) containing an address field equal to 0. Thus, DD0 points to TOSCWO at the base of the stack trunk. At a location having an address equal to 4001, there is a data descriptor (DD1) containing an address field equal to 6988 which is the absolute address of a TOSCW1. At a location having an address equal to 4002, there is a data descriptor (DD2) containing an address field equal to 29,988 which is the same address as is stored in BOSR68.

The PIHP is stored in an array of locations having a base address (5000) pointed to by the segment descriptor (SD1) stored at 25.

The segment dictionary includes TOSCW1, stored at 6988; an MSCW (MSCW1), stored at 7000; a segment descriptor, stored at 7030 and containing an address field equal to 60,000; and a segment descriptor, stored at 7040 and containing an address field equal to 70,000.

In this example, the job stack has been accumulated in locations above the location (29,988) pointed to by BOSR68. A program code segment A is the code segment corresponding to the outer block of an object program. An array of locations having a base address equal to 60,000 store an initial program word, a final program word, and a plurality of intermediate program words which together form the program code segment A.

In this example, program code segment A has been partially executed. During such partial execution, a programmatic calling sequence forming a part of program segment A has caused entry into a program code segment B. An array of locations having a base address equal to 70,000 store an initial program word, a final program word, and a plurality of intermediate program words which together form the program code segment B.

The records of execution of program code segments A and B are stored in the job stack. At a location having an address of 30,000, there is stored an MSCW marking the beginning of the record of execution of segment A. At a location having an address of 30,015, there is an MSCW marking the beginning of the record of execution of segment B, and containing the following fields. Its different stack (DS) and stack number (SN) fields are 0 and 2 respectively. Its displacement field (DISP) equals 12. Note that 12 plus 29,988 (stored in BOSR68) equals 30,000 (the address of the MSCW marking the beginning of the record of execution of segment A). Its LL field is 3, thereby indicating that segment B runs at lexicographical level 3. Its DF field is 15. Note that 30,015 (the address of the MSCW marking the beginning of the record of execution of segment B) minus 15 equals 30,000 (the address of the previous MSCW).

At a location having an address of 30,016, there is stored an RCW containing the following fields. Its PSR and PIR fields are 0 and 30 respectively. These fields indicate the return point where the execution of segment A should be resumed upon exiting or returning from segment B. Its SDI field is 1,30. This field indicates that the segment descriptor is stored in the segment dictionary at a relative address of 30. Note that 30 plus 7000 (the address of (MSCW1) equals 7030 (the address of the segment descriptor pointing to segment A).

In this example, execution of segment B has been interrupted. Accordingly, a hardware-fabricated calling sequence has caused entry into the PIHP. When such a fabricated call is made, the data processor's control unit internally generates pseudo-program operators that emulate a programmatic calling sequence. A detailed description of the manner in which a computer control unit can internally generate "pseudo program operators" can be found in U.S. Pat. No. 3,566,364.

As a result of such a fabricated calling sequence, at a location having an address of 30,025, there is an MSCW marking the beginning of the record of execution (the first recursive level) of PIHP. F register 69 and display register D1 each point to this location. This MSCW has the following fields. Its DS and SN fields are 1 and 0 respectively, thereby indicating that its DISP field is not relative to the present setting of BOSR68. Its DISP field is 20. Note that 20 plus 0 (the address of TOSCWO) equals 20 (the address of MSCWO). Its LL field is 1 thereby indicating the PIHP runs at a lexicographical level of 1. Its DF field is 10. Note that 30,025 (the address of this MSCW) minus 10 equals 30,015 (the address of the historically previous MSCW). At a location having an address of 30,026, there is an RCW containing the following fields. Its PSR and PIR fields are 0 and 50 respectively thereby indicating the return point where execution of segment B should resume. Its LL field is 3 thereby indicating that, on resumption, segment B should run at a lexicographical level of 3. Its SDI field is 1,40, thereby indicating that the segment descriptor for segment B is in the segment dictionary at a relative address of 40.

Execution of PIHP is partially complete and the top word of its record of execution is stored at a location having an address of 30,035. S register 64 points to this location.

In this example, an interrupt signal is recognized by the interrupt controller (IC27) at the point where the program word stored at 5025 is about to be fetched. Following the recognition of the interrupt signal, the IC27 fabricates a calling sequence ordering entry into PIHP. The fabricated calling sequence emulates the programmatic calling sequence involved in entering any procedure. Briefly, the calling sequence includes an MKS operator, a NAMC operator, a series of VALC operators, and an ENTER operator.

Consider now FIG. 4 which is a flow chart illustrating the sequence of operation innvolved in the MKS operator. The MKS operation has two phases. The first phase is a stack adjustment phase (STK ADJ (0,0)). In this first phase, if any words are stored in the A and B registers, the words are pushed down into the memory stack. In the second phase, an IMSCW is pushed down into the memory stack, and the F register is updated to point to this new IMSCW.

During the first phase, OEC29, responsive to the ARO and BRO signals, forms the necessary control signals to adjust the stack down. Control signal T1 gates a word stored in the A register 55 to the bus 51 and also resets AROF66. Control signal T2 gates a word carried by the bus 51 into the B register 57, and also sets BROF65. Accordingly, when control signals T1 and T2 are produced simultaneously, a word stored in the A register is transferred to the B register. This is expressed as A ← B, AROF ← 0, and BROF ← 1.

Next, control signal T3 is applied to S register 64 which points to the top of memory stack word. In the preferred embodiment, the S register is an up/down counter and the pointer it stores is a complete absolute address. Each time a word is pushed down into the memory stack, control signal T3 is applied to the count-up (U) of the S register. Control signal T4 gates the absolute address stored by the S register to the bus 42 which carries the absolute address to MAR17. A write control signal (W) initiates a write cycle in the modular memory. Control signal T5 gates a word stored in the B register to the bus 51 and also resets BROF65. Accordingly, when control signal T3 is produced and, subsequently, control signals T4, W and T5 are produced simultaneously, a word stored in the B register is written into the modular memory and becomes the new word at the top of the memory stack. This is expressed as S ← S + 1 and M[S] ← B and BROF ← 0. The control signals involved in the first phase are produced in a cyclical manner until the ARO and BRO signals each equals 0, at which time, the first phase is complete. Considering FIG. 3 again, assume that the A and B registers each stored a stack word at the time the interrupt signal was recognized. In this event, in response to the pseudo MKS signal produced by IC27, OEC29 causes, during this first phase, these two stack words to be stored into 30,036 and 30,037 and to update the S register to point to 30,037.

During the second phase, control signal T3 is produced again, thereby incrementing the address stored in the S register. OEC29 next produces control signals T6, T7, and SUB. These signals order address adder 39 to calculate the DF field for the new IMSCW. Control signal T6 gates the address stored in the S register to the input bus 40, abd control signal T7 gates the address stored in the F register to the input bus 41. The SUB signal gates the calculated DF field to a portion of the bus 51. In addition, OEC29 produces an IMSCW tag field and a control signal T8. The produced tag field is carried by a portion of the bus 51. The control signal T8 gates the produced tag field into one portion and the DF field into another portion of the C register. This is expressed as C ← IMSCW. Considering the example of FIG. 3 again, the incrementation caused by control signal T3 causes the S register to point to 30,038 and therefore the calculated DF field is 13 (i.e., 30,038–80,025).

After the IMSCW has been stored into the C register, OEC29 produces control signals T9, T4, and W simultaneously. Control signal T9 gates the IMSCW in the C register to the bus 51 which carries the IMSCW to MIR15. Control signal T4 gates the absolute address in the S register to the bus 42 which carries the absolute address to MAR17. The control signal W initiates a write access to the modular memory. Thus, the IMSCW is written into the modular memory and becomes the new word at the top of the stack. This is expressed as a M[S] ← C. Finally, control signal T4 and T10 are produced simultaneously. Control signal T4 gates the absolute address in the S register to bus 42, and control signal T10 gates the absolute address into the F register 69. This is expressed as F ← S. As a result of this operation, in the specific example, the F register points to 30,038.

Consider now FIG. 5 which is a flow chart showing the sequence of operation in executing the hardware-fabricated NAMC operator which is produced by IC27 after completion of the pseudo-MKS operation. As an initial phase, a STK ADJ (0,0) operation is performed to ensure that the A and B registers aree each empty. OEC29 then produces an IRW tag, an LL field having the value 0, and a δ field having the value 3. These three fields are carried by the bus 51. In addition, OEC29 produces control signal T2 which gates these three fields into the B register. This is expressed as B. TAG ← IRW TAG, B.LL ← 0, and B.δ ← 3. The LL value of 0 indicates that the address stored in display register D0 is to serve as a base address. In the specific example, D0 stores 20. The δ value is a relative address. The sum of 20 and 3 is 23 which is the address of PCW1. Thus it can be seen that this NAMC sequence causes an IRW to be stored into the B register and that this IRW points to PCW1.

After the IRW is stored into the B register, the next part of the calling sequence takes place. IC27 produces a parameter (P1) and applies it to the bus 51. At the same time, OEC29 produces control signal T11 which gates P1 into the A register and also sets AROF66. Next, a push-down operation is performed whereby the IRW in the B register is written into the modular memory (at 30,039 in this example), and P1 is transferred into the B register so that the A register is available to store another stack word. Next, IC27 produces another parameter (P2) and stores it into the A register in the manner described above. P1 and P2 are coded in such a way as to identify the type of interrupt condition prevailing.

Figure 6:
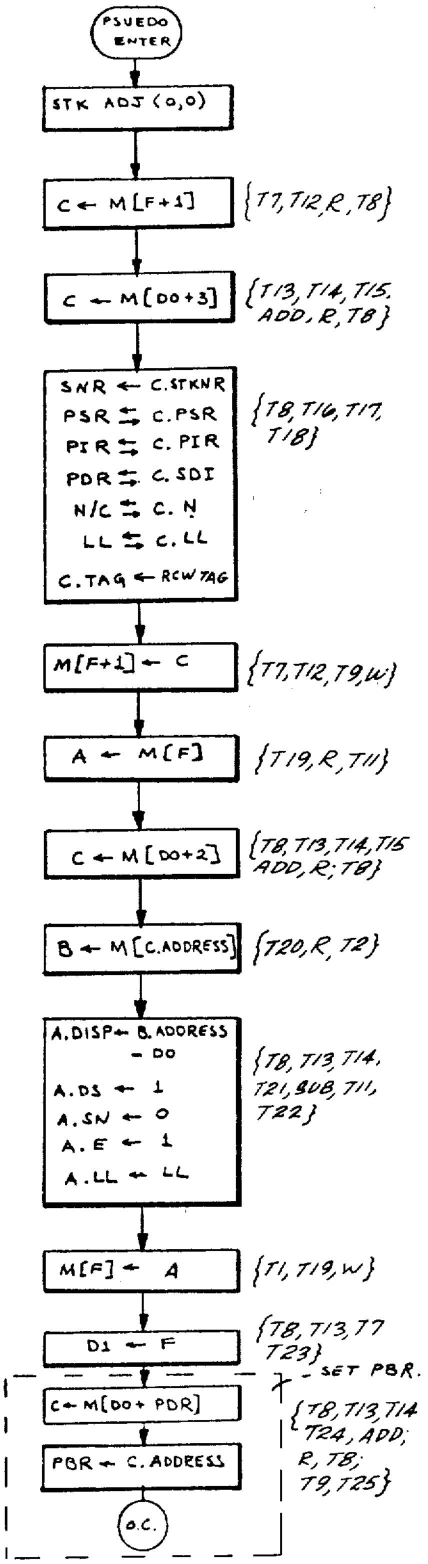
FIG. 6 is a flow chart showing the sequence of operation involved in executing a pseudo-ENTER operator.

Consider now FIG. 6 which is a flow chart showing the sequence of operation in executing the hardware-fabricated pseudo-ENTER operator. U.S. Pat. No. 3,548,384 describes in detail the steps involved in executing the programmatic ENTER operator.

Briefly, execution of the pseudo-ENTER operator involves a number of phases. These phases include using an IRW to obtain a PCW, distributing various fields of the PCW into appropriate registers, generating an RCW and placing the RCW into the stack, updating the address environment list by converting the IMSCW into an MSCW, updating the display registers, using the SDI field of the PCW to obtain the segment descriptor for the new program segment, and setting PBR43 with the address field of the obtained segment descriptor so that it will point to the base of the program segment which is being entered.

As indicated in FIG. 6, in the first phase, a stack adjust operation is performed to ensure that the A and B registers are empty. Next, the IRW, constructed by the NAMC operation described above, is read from the modular memory and is stored into the C register. That is, C ← M[F + 1]. To this end, OEC29 produces control signals T7, T12, R, and T8. Control signal T7 gates the address in the F register to the address adder via the bus 41. Control signal T12 causes the address adder to increment this address and to gate this incremented address to MAR17 via the bus 42. The control signal R initiates a read access and the IRW is stored into MIR15. Then control signal T8 gates the IRW into the C register.

Next, OEC29 produces control signals T13, T14, T15 and ADD. Control signal T13 transfers the LL field of the IRW stored in the C register to the DRSR73. A bus 77 connecting the C register to DRSR carries this LL field. The selection matrix (SM75), responsive to control signal T14 and the LL field in the DRSR73 produces read select signal DOR which causes the address stored in display register D0 to be gated to the address adder 39 via bus 40. Control signal T15 agates the δ field of the IRW in the C register to the bus 41 which carries it to address adder 39. The ADD control signal causes address adder 39 to calculate D0 + δ. Next, OEC29 produces control signal R to initiate a read access. In this example, the location having an address of 23 is read out and the PCW stored therein is transferred to MIR15. Next, OEC29 produces control signal T8 for gating the PCW into the C register. This is represented as C ← M[D0 + 3].

The next phase of the pseudo-ENTER operator involves the construction of an RCW and the distribution of various fields of the PCW into appropriate registers.

To construct the RCW, OEC29 produces an RCW tag field and applies it to the bus 51. At the same time, OEC29 produces control signals T8, T16, T17, and T18. Control signal T8 gates information carried by the bus 51 into the C register. Control signal T16 gates the various fields of the PCW in the C register to various portions of a bus 79. Control signal T17 gates the fields carried by various portions of the bus 79 into various registers. Control signal T18 gates the fields stored in these various registers to the bus 51 for transfer to the C register. As a result, the following fields of information are exxchanged. The STKNR field of the PCW is transferred into the SNR register 63. That is, SNR ← C.STKNR. The PSR field of the PCW is transferred into the PSR register 37 and the previous setting of the PSR register is made a part of the RCW being constructed. This is expressed as PSR ⇆ C. PSR. The SDI field of the PCW is transferred into a program dictionary register (PDR80) and the previous setting of the PDR register is made a part of the RCW constructed. This is expressed as PDR ⇆ C.SDI. The N field of the PCW is transferred into a normal/control state flip-flop (N/C82) and the previous setting of the N/C82 is made a part of the RCW being constructed. This is expressed as N/C ⇆ C.N. The LL field of the PCW is transferred into the LL register 71 and the previous setting of the LL register is made a part of the RCW being constructed. This is expressed as LL ⇆ C.LL.

With the construction of the RCW complete, OEC29 produces control signals to cause the RCW to be stored into the modular memory to replace the IRW placed therein during the hardware-fabricated calling sequence. This is expressed as M[F + 1] ← C.

In the next phase of the pseudo-ENTER operator execution, the IMSCW is converted into an MSCW. To this end, the IMSCW is read from the modular memory and is stored into the A register. That is, A ← M[F]. In order to complete the IMSCW, it is necessary to calculate the DISP field. Before calculating the DISP field, it is necessary to obtain the base address to which the DISP field is relative. The base address for the DISP field of an MSCW marking the beginning of a record of execution of PIHP is the address of the top of stack control word (TOSCWO) for the stack trunk. Accordingly, it is necessary to obtain the address of TOSCWO. This is accomplished in two steps. First, the stack vector descriptor (DDV) is read out of memory and stored into the C register. That is, C ← M[D0 + 2]. Second, the address field of DDV is used to read out the data descriptor (DDO) pointing to TOSCWO. That is, C ← M [C.ADDRESS]. In the specific example, D0 +2 equals 22 which is the address of DDV. The address field of DDV is 4000 which is the address of DDO. The address field of DDO is 0 which is the address of TOSCWO. Thus, in this example, the base address is 0 for the DISP field being calculated.

OEC29 controls the execution of this phase in the following manner. Control signals T19 and R are produced to gate the address in the F register to MAR17 via bus 42 and to cause the addressed IMSCW to be read out of the modular memory and to be stored into MIR15. Control signal T11 is produced to transfer the IMSCW into the A register. Next, OEC29 produces an LL field having a value of 0 and a δ field having a value of 2 and applies these two fields to portions of the bus 51. At the same time, OEC29 produces control signal T8 to gate these two fields into C register. Next, OEC29 produces control signals T13, T14, T15, and ADD. These control signals cause address adder 39 to receive D0 and 2 and to store the calculated sum into MAR17. At the same time, OEC29 produces control signal R, and DDV is read out and stored into MIR15. Next, OEC29 produces control signal T8, and, in response, DDV is transferred into the C register. Next OEC29 produces control signal T20 which gates the address field of DDV to the bus 42 and produces control signal R to initiate a read access. This causes DDO to be read out of the modular memory and to be stored into MIR15. Next, OEC29 produces control signal T2 and thereby gates DDO into the B register. That is, B ← M[D0 + 2]. Next, OEC29 produces an LL field having the value 0 and applies it to a portion of the bus 51. At the same time, OEC29 produces control signal T8 to gate the LL field into the C register. Next, OEC29 produces control signals T13 and T14 which gate the address stored in display register D0 to the address adder via the bus 40. At the same time, OEC29 produces control signals T21 and SUB which gate the address field of the DDO stored in the B register to the address adder via the bus 41 and orders the address adder to calculate the DISP field. Control signal T11 is then produced to gate the calculated DISP field into the A register via the bus 51. At the same time, OEC29 produces the following fields and applies them to the bus 51 so that they also will be gated into the A register: A different stack field (DS) having the value of 1, a stack number field (SN) having the value 0, an environment field (E) having the value 1. Also at the same time, OEC29 produces control signal T22 which gates the LL field stored in LL register 71 to portion of the bus 51. These transfers are expressed as A.-DISP ← B.ADDRESS — DO, A.DS ← 1, A.SN ← 0, A.E ← 1, and A.LL ← LL. As a result of these transfers, the IMSCW in the A register is converted into an MSCW.

With the MSCW now complete, OEC29 produces the control signals necessary to write the MSCW into the modular memory to replace the IMSCW. That is, M[F] ← A.

The next phase of the pseudo-ENTER operator involves updating the display register D1 so that it points to the new MSCW. This is accomplished by gating the address stored in the F register into the display register D1. That is, D1 ← F. To this end, OEC29 produces an LL field having the value 1 and stores it into the C register. This LL field is then gated to DRSR73. OEC29 then produces control signals T7 and T23. Control signal T7 gates the address stored in the F register to the bus 41. In response to control signal T23 and DRSR73, SM75 produces selection signal D1W. In response, the address stored in the F register is gated into the display register D1.

The final phase of the pseudo-ENTER operator involves the setting of the program base register (PBR43) so that it points to the base address of PIHP. To this end, the segment descriptor (SD1) for the PIHP is read out of the modular memory and is stored into the C register. That is, C ← M[DO + PDR]. Then, the address field of SD1 is used to set PBR43. That is, PBR ← C.ADDRESS.

In this final phase, OEC29 causes the address stored in display register D0 to be gated to bus 40 in the manner described above. Also, OEC29 produces control signals T24 and ADD which gate the address stored in PDR80 to bus 41 and order the address adder 39 to calculate the address of SD1, respectively. Then a read memory access is initiated and SD1 is stored into the C register in the manner described above. Finally, OEC29 produces control signals T9 and T25 to gate the address field of SD1 from the C register into PBR43 via the bus 51.

Consider now the following summary of the effect of this hardware-fabricated calling sequence in the specific example. The memory locations having the addresses 30,036 and 30,037 now store stack words forming the top part of the record of execution of the first recursive level of PIHP. The in memory location having the address 30,038 now stores an MSCW marking the beginning of the record of execution of the second recursive level of PIHP. This MSCW has the identical fields as the MSCW stored at 30,025 except that the DF field is 13. The F register and the display register D1 have been updated. Each stores 30,038 and thereby points to the new MSCW. The memory location 30,039 now stores an RCW. This RCW contains the information needed to resume execution of the first recursive level of PIHP. The memory locations having the addresses 30,039 and 30,040 store P1 and P2 which are the parameters being passed to the second recursive level of PIHP. The S register 64 has been updated. It stores 30,040 and thereby points to P2 which is now the top of stack word. Finally, the program segment pointing means (PDR41, PBR43, PIR45, and PSR37) has been updated to point to the initial syllable of PIHP. That is, PDR41 stores the SDI field 0,5; PBR43 stores 5000 which is the base address of PIHP, and PIR45 and PSR37 each store 0.

After the execution of the pseudo-ENTER operator, the initial program word of PIHP is fetched. To this end, address adder 39 calculates the sum of the addresses stored in PBR43 and PIR45, and in this example, produces an absolute address of 5000. With this address, the modular memory is read out and the initial program word is stored into the program register. At the same time, the address in PIR43 is incremented (by control signal T26) so that it points to the next program word of PIHP.

From the foregoing, it can be seen that upon interruption of PIHP, PIHP is entered recursively.

Consider now the situation wherein PIHP is not interrupted during execution of its second recursive use. In this situation, PIHP will proceed through a complete logical execution and process an interrupt condition. At the end of this complete logical execution, the final program word of PIHP will be fetched from memory. This final program word includes an EXIT program operator.

Figure 7:
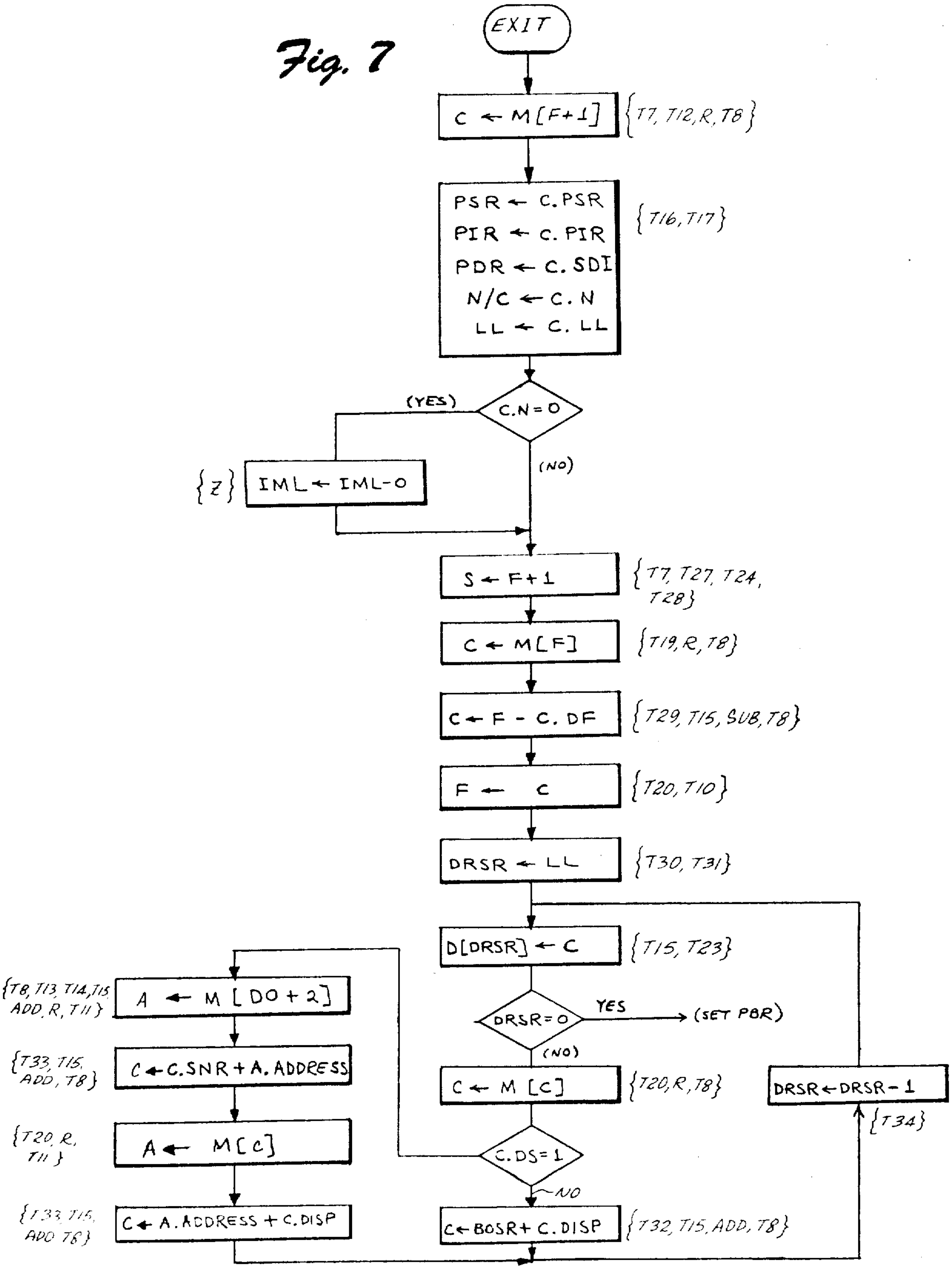
FIG. 7 is a flow chart showing the sequence of operation involved in executing an EXIT operator.

FIG. 7 is a flow chart showing the sequence of operation involved in executing the EXIT operator.

Initially, RCW is read from the modular memory and is stored into the C register. That is C ← M[F + 1]. To this end, OEC29 produces control signals T7, T12, R, and T8. Control signal T7 gates the address in the F register to the address adder 39 via bus 41. Control signal T12 orders the address adder 39 to add 1 to this address and to gate the sum to MAR17. The R signal initiates a read access, and control signal T8 gates into the C register the RCW read out of the addressed location.

The return point information contained in the RCW is then distributed to various registers. That is, PSR ← C.PSR, PDR ← SDI, N ← C.N and LL ← C.LL. The control signals involved in these transfers are the same as those explained above in connection with the same transfers made in executing the pseudo-ENTER operator.

Next, a check is made of the N field of the RCW which is stored in the C register. An N field of 0 indicates that the RCW is providing return point information about an object program procedure. That is, following the EXIT operation, normal state processing will resume. An N field of 1 indicates that the RCW is providing return point information about a control state program procedure.

Depending upon the result of this check, a step which is explained below is either performed or bypassed and then OEC29 updates the S register 64 so that it points to the top of memory stack word for the record of execution of the procedure to which control is being transferred by the EXIT operator. That is, S ← F1. To this end, OEC29 produces control signals T7, T27, and T24. Control signal T7 gates the address in the F register to the bus 41. Control signal T27 gates this address into the S register. Next, control signal T23 causes the S register to count down by 1.

Next, the MSCW marking the beginning of the record of execution of the procedure from which control is being transferred is obtained from the modular memory. The obtained MSCW is stored into the C register. That is, C ← M[F]. To this end, OEC29 produces control signals T19, which gates the address in the F register to MAR17, and control signals R, and T8, which read out and gate the MSCW into the C register.

Next, the address of the historically previous MSCW is calculated. That is C ← F – C.DF. To this end OEC29 produces control signals T29, T15, SUB, and T8. Control signal T29 gates the address stored in the F register to address adder via bus 40. Control signal T15 gates the DF field of the MSCW stored in the C register to the address adder via the bus 41. The SUB signal orders the address adder to calculate the difference and apply it to the bus 51. Control signal T8 gates the calculated difference into the C register.

Next, the F register is updated with the calculated address. That is, F ← C. To this end, OEC29 produces control signals T20 and T10 which gate the address from the C register to the F register via the bus 42.

At this point, preparation is made to update the display registers. To this end, the LL value obtained from the RCW is transferred into DRSR73. That is, DRSR ← LL. To this end, OEC29 produces control signals T30 and T31 which gate the LL value from the LL register 71 to DRSR73 via the bus 77.

At this point, a loop is entered the purpose of which is to update the display register.

In an initial step of the loop, the address of an MSCW calculated and stored in the C register is written into the display register indentified by DRSR73. That is, D[DRSR] C. To this end, OEC produces control signals T15 and T23 which gate the address in the C register into the selected display register via the bus 41

If at this point, DRSR stores 0, the loop is complete. If not, a memory access is effected to obtain an MSCW. Recall that the C register stores the address of an MSCW. Accordingly, the address stored in the C register is used in the memory access. The MSCW obtained in this access is stored into the C register. That is, C ← M[C]. The control signals involved in this transfer are T20, R, and T8 which have been described above.

At this point the different stack field (DS) of the obtained MSCW is checked. If DS = 0, the current setting of BOSR68 is used as a base address for calculating the address of the next MSCW in the linked list. The DISP field of the MSCW in the C register is used as a relative address. Address adder 39 calculates the desired address and stores it into the C register. That is, C ← BOSR + C.DISP. To this end, OEC29 produces control signals T32, T15, ADD, and T8. Control signal T32 gates the address stored in BOSR68 to address adder 39 via bus 40. The remaining control signals have been described above.

If the DS field equals 1, the BOSR68 setting is not used. Instead, it is necessary to obtain the address of a TOSCW which address is used as a base address for calculating the absolute address of an MSCW. The address of the TOSCW is obtained by reading out the stack vector descriptor (A ← M[DO+2]), using the address field of the stack vector descriptor and the stack number field to obtain the address of a selected data descriptor in the stack vector array (C ← C.SNR + A.ADDRESS), and then obtaining the selected data descriptor (A ← M[C]). At this point, the A register stores the data descriptor containing an address field serving as a base address. Now the absolute address of the next MSCW can be calculated (C ← A.ADDRESS + C.DISP). The only control isgnal involved in these steps, not previously discussed, is control signal T42 which gates the address field stored in A register 55 to address adder 39 via the bus 40.

Thus, whether DS equals 1 or 0, steps are performed so as to store into the C register the address of an MSCW.

Next, OEC29 produces control signal T33 which causes DRSR to count down by one count or level so as to identify the next lower level display register. At this point, the loop starts again.

After the display register updating sequence is complete, the rest of the information needed to return is obtained. That is, a segment descriptor is obtained and its address field is used to set PBR43 in the manner described above in connection with FIG. 6.

From the foregoing, it can be seen that the system 1 is adapted to use PIHP recursively to process a plurality of time spaced-apart interrupt conditions. Consider now the means provided in the system 1 for eliminating the above-described latent problem of fruitless attempts to enter PIHP recursively.

With reference again to FIG. 3, it should be noted that a secondary interrupt handling procedure (SIPH) is stored in memory module 9. Thus, when there is a failure in memory module 7 which prevents use of PIHP, the system 1 can still make access to memory module 9 to use SIHP. The initial system word of SIHP is stored in a location having the address 505,000. Information required in order to enter SIHP is also preferably stored in memory module 9. Thus an alternate stack trunk and an alternate stack vector array is stored in memory module 9 on a substantially continuous basis. As indicated, there is a top of stack control word (TOSCW–S) for the alternate stack trunk. TOSCW–S is stored in a location having the address 500,000. A data descriptor (DDVA) is stored at 500,022. DDV contains an address field pointing to the alternate stack vector array. A program control word (PCW-S) is stored at 500,023 and contains fields used to set the program segment pointing means during entry into SIHP. Above the alternate stack trunk, a separate area of memory is allocated for storing the record of execution of SIHP.

Figure 8:
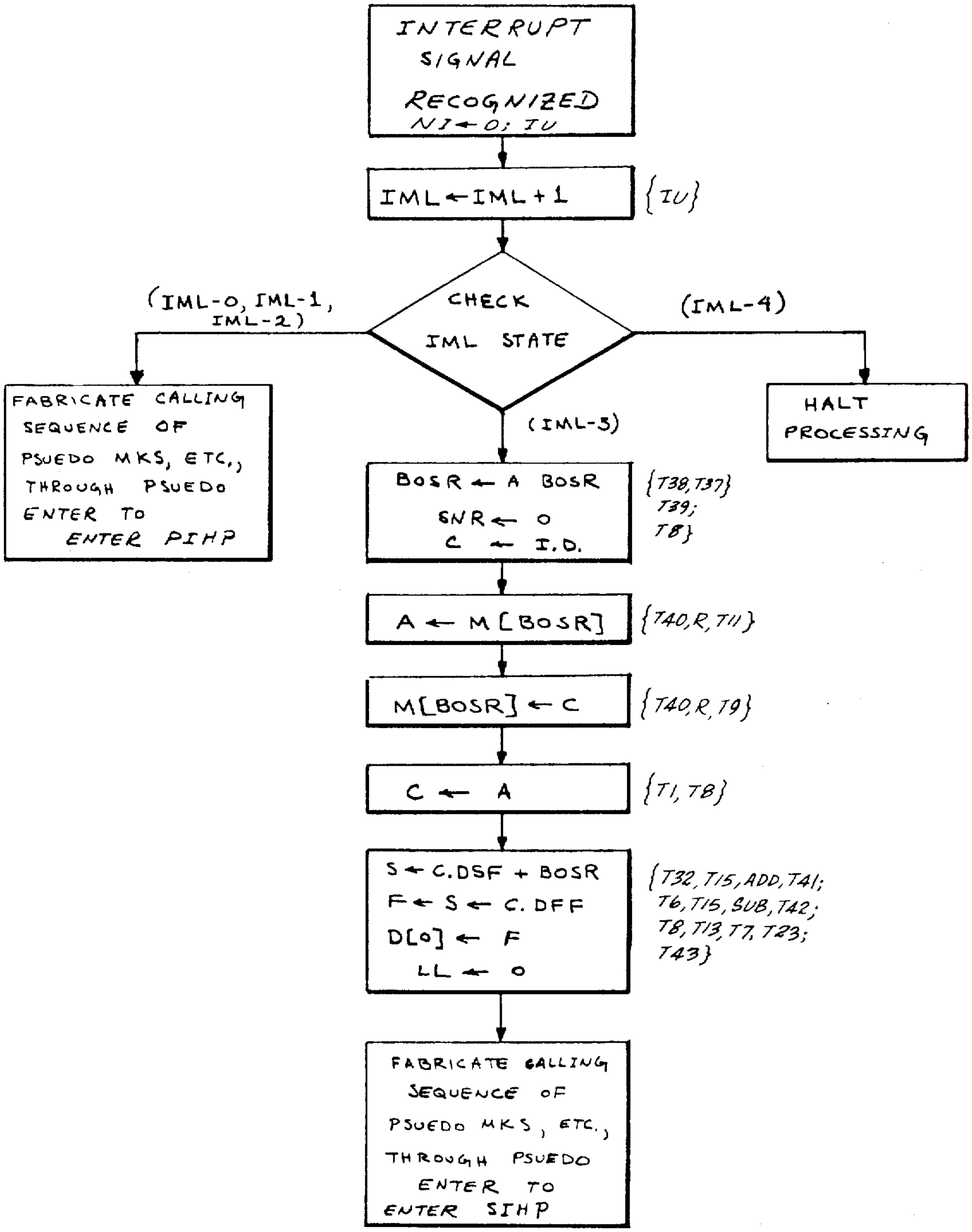
FIG. 8 is a flow chart showing, among other things, the manner in which a secondary or back-up interrupt handling procedure is entered.

Consider now FIG. 8. As indicated, each time an interrupt signal is recognized, the interrupt controller (IC27) produces control signal IU and provides a 0 as an NI signal. While NI is '0,', gate 38 is disabled and PSR37 is not incremented by SECL. An interrupt machine level register (IML85), shown in FIG. 1, has a count-up input which receives control signal IU. IML85 can assume any one of a plurality of ordered states denominated IML–0, IML–1, IML–2, IML–3, and IML–4. While the data processor 5 is executing an object program procedure, IML85 is in its lowest order state IML–0. This is a consequence of the resetting of the IML register during execution of the EXIT operator. Recall that during such execution a check is made of the value of the N field of the RCW. When the N field is 0, OEC29 produces control signal Z which sets the IMR register to state IML–0. Each time control signal T34 is received, IML85 changes from its present state to the next higher order state. Accordingly, when an interrupt signal is recognized while the data processor 5 is executing an object program procedure, IML85 is set to assume state IML–1. Moreover, when an interrupt signal is recognized while the data processor is executing PIHP in a first recursive level, IML85 is set to assume IML–2.

IML85 provides an indication of its state to IC27. If after control signal IU is produced, IML85 is in any one of its three lowest order states (i.e., IML–0, IML–1, or IML–2), the data processor 5 proceeds to fabricate the calling sequence described above for entering PIHP.

In the absence of any drastic failure such as a failure in memory module 7, PIHP will be entered successfully. Each time PIHP is entered, there are two parameters (P1 and P2) which are passed to it so as to identify the type of interrupt condition prevailing. PIHP is arranged in a conventional manner to make use of the information contained in P1 and P2 in deciding what action is required to process the interrupt condition prevailing. For example, PIHP includes the VALC operators discussed above and described in detail in U.S. Pat. No. 3,546,677. Such VALC operators are used to bring P1 and P2 to the top of the stack as needed. Another significant item of information available to PIHP is the state of IML85. That is, the state of IML85 can be programmatically interrogated. Moreover, the state of IML85 is programmatically controllable. To this end, the program operator repertory of the system 1 includes the program operators read the interrupt machine level register (RIML) and set the interrupt machine level register (SIML).

When the RIML operator is stored into the program register 31 and decoded, OEC29 produces control signals T34 and T11 which gate the state indication provided by IML85 into the A register via bus 51. Thus the state indication is stored into the stack where the information it contains can be used by PIHP in deciding what action to take. When the SIML operator is stored into the program register and decoded, OEC29 produces control signals T35 and T36 which gate a field of the SIML operator into IML85 via bus bus 51.

The feature whereby IML85 can be programmatically interrogated and set has the following advantage. So long as entry into PIHP is possible, IML85 can be programmatically set to one of its lower level states. Accordingly, recursive use of PIHP is still achievable to any necessary recursive level.

Consider now in connection with FIG. 8 an exemplary situation that arises and prevents successful entry into PIHP. In this example, there is a failure in memory module 7 which makes it impossible to read out the program words of PIHP. In this example, initially IML85 is in state IML–0 and the data processor 5 is executing an object program procedure. Then an external interrupt signal produced by means 11 is recognized by IC27. In response IC27 causes IML85 to go to state IML–1. Next, a fabricated calling sequence is executed in an attempt to enter PIHP. However, when the pseudo-ENTER operator is executed and a location in memory module 7 is accessed for reading, another interrupt signal is produced. This interrupt signal is an alarm interrupt signal produced by means 21. The alarm interrupt signal is recognized, and IC27 causes IML85 to go to state IML–2. Again, a fabricated calling sequence is executed with the same result of another alarm interrupt signal being produced. Now IC27 causes IML85 to go to state IML–3.

When a check of the state of IML85 indicates that it is in state IML–3, the data processor 5 terminates attempted use of PIHP. At this point, OEC29 produces control signals T27 and T38. These control signals gate an address stored in an alternative base of stack register ABOSR87 to BOSR68 via the bus 40. The address so transferred is the address of a TOSCW for an alternative stack trunk. In this example, ABOSR87 stores 500,000 and points to TOSCW–(S). At the same time, OEC29 produces control signals T39 and T8 and applies to bus 51 an operand identifying the data processor 5. Control signal T39 resets the SNR register 63. Control signal T8 gates the processor ID carried by the bus 51 into the C register.

Next, OEC29 produces control signals T40, R, and T11. Control signal T40 gates the address in BOSR68 to MAR17 via bus 42. Control signal R initiates a read access, and TOSCW–(S) is stored into MIR15. Control signal T11 gates this TOSCW into the A register from MIR15. This is expressed as A ← M[BOSR].

Next, OEC29 produces control signals T40, W, and T9 which transfer the processor ID from the C register to MIR15 and write it into the modular memory. That is, M[BOSR] ← C.

Next, the TOSCW is transferred from the A register to the C register. That is, C ← A. To this end, OEC29 produces control signals T1 and T8 simultaneously.

Next, a new setting for the S register is calculated from the information contained in the TOSCW. That is, S ← C.DSF + BOSR. To this end, OEC29 produces control signals T32, T15, ADD, and T41. Control signal T32 gates the address stored in BOSR68 to address adder 39 via the bus 40. Control signal T15 gates the DSF field of the TOSCW to the address adder via the bus 41. Address adder 39 responds to the ADD signal to calculate and apply the sum to the bus 42. Control signal T41 gates the sum into the S register.

Next, a new setting for the F register is calculated. That is, F ← S – C.DF. To this end, OEC29 produces control signals T6, T15, SUB, and T42. Control signal T6 gates the address stored in the S register to the address adder via the bus 40. Control signal T15 gates the DFF field of the TOSCW in the C register to the address adder via the bus 41. The address adder, responsive to the SUB signal calculates and applies the difference to the bus 51. Control signal T42 gates this difference into the F register.

Next, the display registers are updated to reflect the new addressing environment. In these circumstances, where control is transferred to SIHP, only the lowest lexicographical level is involved. Accordingly, only display register D0 is updated. That is D[0] ← F. The control signals involved in this transfer have been described above. At the same time, OEC29 produces control signal T43 which resets the LL register. That is, LL ← 0.

Next, a hardware fabricated calling sequence is executed to cause entry into SIHP.

In the event that another interrupt signal is recognized while the IML register is in state IML–3, the IML register is set to state IML–4. This could happen when there is a failure in the MCU13, for example, of a type which would prevent access to any of the memory modules. In this event, OEC29, upon determining that the IML register is in state IML–4 causes the data processor to halt processing.

TABLE II

| Control Signal | Action |
|---|---|
| T1 | 51 ← A; AROF ← 0 |
| T2 | B ← 51; BROF ← 1 |
| T3 | S ← S + 1 |
| T4 | 42 ← S |
| T5 | 51 ← B; BROF ← 0 |
| T6 | 40 ← S |
| T7 | 41 ← F |
| T8 | C ← 51 |
| T9 | 51 ← C |
| T10 | F ← 42 |
| T11 | A ← 51 |
| T12 | 42 ← [41] + 1 (See ADDER 39) |
| T13 | DRSR ← C.LL (See BUS 77) |
| T14 | Read a selected display register (see S.M.75) |
| T15 | 41 ← C |
| T16 | 79 ← C |
| T17 | PSR, PIR, PDR, N/C,LL ← 79 |
| T18 | 51 ← SNR, PSR, PIR, PDR, N/C,LL |
| T19 | 42 ← F |
| T20 | 42 ← C |
| T21 | 41 ← B |
| T22 | 51 ← LL |
| T23 | Write in a selected display register (See S.M.75) |
| T24 | 41 ← PDR |
| T25 | PBR ← 51 |
| T26 | PIR ← PIR + 1 |
| T27 | S ← 41 |
| T28 | S ← S + 1 |
| T29 | 40 ← F |
| T30 | DSR ← 79 |
| T31 | 79 ← LL |
| T32 | 40 ← BOSR |
| T33 | DRSR ← DRSR – 1 |
| T34 | 51 ← IML |
| T35 | 51 ← P |
| T36 | IML ← 51 |
| T37 | BOSR ← 40 |
| T38 | 40 ← ABOSR |
| T39 | SNR ← 0 |
| T40 | 42 ← BOSR |
| T41 | S ← 42 |
| T42 | 40 ← A |

What is claimed is:

1. A fail-soft data processing system comprising:

memory means storing a first and a second interrupt handling procedure;

signaling means operable for producing a plurality of interrupt signals each indicating the existence of one of a plurality of interrupt conditions, the signaling means being operative to produce a succession of such interrupt signals one at a time;

means for processing interrupt conditions including processing means response to a succession of time spaced-apart interrupt signals for recursively using the first interrupt handling procedure to process the interrupt conditions, the processing means cyclically attempting but failing to use the first interrupt handling procedure in the event of a failure wherein each time in the cycle that the processing means attempts to use the first interrupt handling procedure an interrupt signal is produced and the processing means again attempts to use the first interrupt handling procedure;

interrupt machine level register means having an input so as to be settable to assume any one of a plurality of ordered states, and having an output providing a corresponding plurality of state indications;

means coupled to the input of the level register means for setting it to assume its lowest order state when no interrupt conditions continue to exist;

means coupled to the input of the level register means for setting it to a predetermined higher order state after a succession of interrupt signals are produced and, for each of the succession, the processing means has failed to use the first interrupt handling procedure comprising means responsive to each interrupt signal for setting the level register means to assume a state having a higher order than its state immediately prior to the interrupt signal; and means responsive to the coincidence of a state indication corresponding to the predetermined higher order state and an interrupt signal for providing an indication of such coincidence, means responsive to such indication for terminating attempted use of the first interrupt handling procedure, and means for causing the processing means to execute the second interrupt handling procedure when attempted use of the first interrupt handling procedure is terminated.

2. A system according to claim 1 wherein the memory means comprises a modular memory having a plurality of memory modules each including a plurality of addressable locations, a plurality of the locations in a first memory module storing a code segment forming the first interrupt handling procedure, a plurality of the locations in a second memory module for storing a code segment forming the second interrupt handling procedure, and wherein the second memory module is operative independently of a failure in the first memory module.

3. A system according to claim 2 wherein the code segment forming the first interrupt handling procedure includes a predetermined program operator, the system further comprising means responsive to said predetermined program operator for setting the level register means to one of its lower order states so that the first interrupt handling procedure can be used recursively for an arbitrary number of recursive entries.

4. A system according to claim 1 wherein the memory means stores an object program procedure and includes first and second pluralities of addressable locations for storing stacks of words; the processing means including a stack mechanism for reading and writing words to accumulate stacks, the stack mechanism being responsive to the object program procedure to accumulate its record of execution in the first plurality of locations, being responsive to the first interrupt handling procedure to accumulate its record of execution for each of a plurality of recursive uses in the first plurality of locations, and being further responsive to the second interrupt handling procedure to accumulate its record of execution in the second plurality of locations.

5. A system according to claim 4 wherein the stack mechanism comprises first register means for storing a pointer to the top word of a stack being accumulated in the memory means, and second register means for storing a pointer serving as a base address for base-relative addressing of stack words; and wherein the means for causing the processing means to execute the second interrupt handling procedure includes means for storing into the first register means a pointer to one of the second plurality of locations and means for storing into the second register means a pointer to one of the second plurality locations.

6. A system according to claim 5 wherein the first interrupt handling procedure includes a predetermined program operator; the system further comprising means responsive to said predetermined program operator for setting the level register means to one of its lower order states so that the first interrupt handling procedure can be used recursively for an arbitrary number of recursive entries.

7. A programmable data processing system comprising:

a memory means comprising a plurality of addressable locations of which a plurality store an object program code segment, a plurality store a primary interrupt handling code segment, a plurality store a secondary interrupt handling code segment, each code segment including a string of program operators;

means operable for producing a plurality of interrupt signals each indicating the existence of an interrupt condition, and being operative to produce a succession of such interrupt signals one at a time;

a data processor for executing the program segments without modifying their program operators during such execution so that the program segments can be used recursively, the data processor comprising a. program pointing means settable to point to a selectable program operator and operative to point sequentially to a plurality of program operators in a string following the selected program operator, b. program fetch means for reading out a string of program operators pointed to by the program pointing means, c. processing means, including a stack mechanism, responsive to the read-out program operators for reading from and writing into a plurality of locations in a last-in, first-out order to accumulate during execution of a code segment a plurality of memory stack words representing the record of execution of the code segment, the stack mechanism including means for pointing to a memory stack word which was the last to be accumulated, d. interrupt machine level register means having an input so as to be settable to assume any one of a plurality of ordered states and having an output for providing a corresponding plurality of state indications, e. means for setting the level register means to its lowest ordered state when no interrupt conditions continue to exist, f. means responsive to each of a succession of interrupt signals for setting the level register to assume a state having a higher order than its state immediately prior to the interrupt signal, g. means for selecting either the primary or the secondary interrupt handling program segment to control the processing of an interrupt condition, the primary interrupt handling procedure being selected for use when an interrupt signal occurs while the level register means is in its lowest order state and being selected for recursive use while the level register means is in one of a plurality of its lower order states, the secondary interrupt handling procedure being selected after the level register means has been set to assume a predetermined higher order state, h. means for causing the processing means to begin executing the selected interrupt handling code segment including means for initializing the program pointing means to point to a predetermined program operator of the selected interrupt handling code segment.

8. A system according to claim 7 wherein the memory includes a further plurality of locations of which a plurality store a stack trunk, and a plurality store an alternate stack trunk, the stack trunk including a control word containing fields pointing to the primary interrupt handling code segment, the alternate stack trunk including a control word containing fields pointing to the secondary interrupt handling code segment, and wherein the initializing means includes means for reading out the control word containing fields pointing to the selected interrupt handling code segment and means responsive to the fields for initializing the program pointing means.

9. A system according to claim 8 wherein the memory includes a further plurality of locations for storing a job stack, and wherein the stack mechanism accumulates in the job stack locations the record of execution of the primary interrupt handling code segment.

10. A system according to claim 9 wherein the memory is arranged in a plurality of memory modules of which a first module stores the primary interrupt handling code segment and a second module, operative independently of the first module stores the secondary interrupt handling code segment.

11. A system according to claim 7 wherein the primary interrupt handling code segment includes a predetermined program operator, the data processor further comprising means responsive to the predetermined program operator for setting the level register means to assume one of its lower order states.

12. A system according to claim 11 wherein the predetermined program operator contains a field indicating the level to which the level register means is to be set, and wherein the means responsive thereto sets the level register means in accordance with the indicated level.

13. A programmable data processing system comprising:

a memory storing procedures including an object program procedure to be executed, a first interrupt handling procedure which is to be executed while execution of the object program procedure is interrupted and which is re-enterable before its execution is complete, and a second interrupt handling procedure;

means operable for producing a plurality of interrupt signals each to indicate the existence and to identify the type of each of a plurality of interrupt conditions including interrupt conditions resulting from a failure, and being operative to produce a succession of such interrupt signals one at a time;

a data processor for executing the procedures stored in the memory, the data processor including:

a. means for recognizing the interrupt signals;

b. register means settable to assume any one of a plurality of states;

c. means for setting the register means including means for setting it to assume a first state during execution of an object program procedure, means for setting it to assume a second state in response to a recognition of an interrupt signal while the register means is in the first state, and means for setting it to assume a third state in response to recognition of a plurality of interrupt signals during an interval beginning and ending when the register means is set to assume the second state and is set to assume the first state again;

d. means for causing the data processor to begin executing the interrupt handling procedures including means for causing re-entry into the first interrupt handling procedure in response to each interrupt signal recognized during said interval and including means for causing entry into the second interrupt handling procedure while the register means is in the third state so that the second interrupt handling procedure can control the processing of interrupt conditions when the first interrupt handling procedure is unable to do so because of the failure.

14. A programmable data processing system comprising:

memory means storing an object program procedure and a first and a second interrupt handling procedure, and having a first and a second plurality of addressable locations for storing a first and a second stack of words respectively, each procedure having a plurality of intermediate program operators and an initial and a final program operator to be executed before and after respectively any intermediate program operator during any complete execution of the procedure;

means operable for producing a plurality of interrupt signals each indicating the existence of an interrupt condition, and being operative to produce a succession of such interrupt signals one at a time; and a data processor including a. an operator register for storing each program operator at the time it is to be executed, b. a stack pointer register, c. means coupled to the operator register for executing program operators including means for storing each intermediate result obtained by executing a program operator into a location selected by the stack pointer register, d. means for recognizing the interrupt signals, e. interrupt machine level register means having an input so as to be settable to assume any one of a plurality of states including first, second, and third states, and having an output providing first, second, and third state indications while in the corresponding states, f. means for setting the level register means including means for setting it to assume the first state during execution of the object program procedure, means for setting it to assume the second state in response to the coincidence of the recognition of an interrupt signal and the first state indication, and means for setting it to assume a third state in response to the recognition of a plurality of interrupt signals during an interval beginning and ending when the level register means is set to assume the second state and is set to assume the first state again, g. means responsive to the coincidence of either the first or the second state indication and the recognition of an interrupt signal for transferring to the register means the initial program operator of the first interrupt handling procedure, and h. means operative to transfer to the operator register the initial program operator of the second interrupt handling procedure when the level register means is set to assume the third state.

15. A programmable data processing system comprising:

memory means storing an object program procedure and a first and second interrupt handling procedure, and having a first and a second plurality of addressable locations for storing a first and a second stack of words respectively, each procedure having a plurality of intermediate program operators and an initial and a final program operator to be executed before and after respectively any intermediate program operator during any complete execution of the procedure;

means operable for producing a plurality of interrupt signals each indicating the existence of an interrupt condition, and being operative to produce a succession of such interrupt signals one at a time; and a data processor including:

a. an operator register for storing each program operator at the time it is to be executed, b. means coupled to the operator register for executing program operators, sequential execution of a plurality of program operators in each procedure yielding a plurality of intermediate-result words, c. means for accumulating the intermediate-result words into a stack having a top of stack word by writing them into and reading them from the locations in a last-in, first-out order, and including a stack pointer register for keeping track of which location stores the top word of the stack being accumulated, the stack pointer register storing during execution of either the object program procedure or the first interrupt handling procedure an address of one of the first plurality of locations;

d. means for recognizing the interrupt signals, e. interrupt machine level register means having an input so as to be settable to assume any one of a plurality of states including first, second, and third states, and having an output providing first, second, and third state indications while in the corresponding states, f. means for setting the level register means including means for setting it to assume the first state during execution of the object program procedure, means for setting it to assume the second state in response to the coincidence of the recognition of an interrupt signal and the first state indication, and means for setting it to assume a third state in response to the recognition of a plurality of interrupt signals during an interval beginning and ending when the level register means is set to assume the second state and is set to assume the first state again, and g. means for causing the data processor to begin executing the interrupt handling procedures including means responsive to the coincidence of either the first or the second state indication and the recognition of an interrupt signal for transferring to the operator register the initial program operator of the first interrupt handling procedure, and means operative to transfer to the operator register the initial program operator of the second interrupt handling procedure when the level register means is set to assume the third state and operative to store into the stack pointer register an address of one of the second plurality of locations.

16. A method for handling interrupt conditions in a data processing system comprising the steps of a. storing in a memory an object program procedure, a first interrupt handling procedure which is coded to be re-entrant, and a second interrupt handling procedure;

b. forming an interrupt signal to indicate the existence of and to identify the type of each interrupt condition;

c. recursively calling the re-entrant interrupt handling procedure for execution from its beginning in response to a plurality of interrupt signals;

d. recording a count of the number of recursive calls made on the re-entrant interrupt handling procedure before it is exited from at its completion;

e. detecting the coincidence of an interrupt signal and a count of a predetermined plurality of recursive calls; and f. responsive to such detecting, calling the second interrupt handling procedure.

* * * * *